(12) United States Patent
Kida et al.

(10) Patent No.: US 8,489,620 B2
(45) Date of Patent: Jul. 16, 2013

(54) ANALYSIS PREPROCESSING SYSTEM, ANALYSIS PREPROCESSING METHOD AND ANALYSIS PREPROCESSING PROGRAM

(75) Inventors: Kouji Kida, Tokyo (JP); Kenichiro Fujiyama, Tokyo (JP); Teruyuki Imai, Tokyo (JP); Nobutatsu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/148,833

(22) PCT Filed: Feb. 19, 2010

(86) PCT No.: PCT/JP2010/001107
§ 371 (c)(1),
(2), (4) Date: Aug. 24, 2011

(87) PCT Pub. No.: WO2010/095458
PCT Pub. Date: Aug. 26, 2010

(65) Prior Publication Data
US 2011/0320465 A1    Dec. 29, 2011

(30) Foreign Application Priority Data

Feb. 20, 2009    (JP) ................................. 2009-038412

(51) Int. Cl.
*G06F 17/00*    (2006.01)
(52) U.S. Cl.
USPC .......................................... 707/752; 707/801
(58) Field of Classification Search
None
See application file for complete search history.

(56) References Cited

U.S. PATENT DOCUMENTS 7,920,753 B2 *    4/2011    Wang et al. ................... 382/254

FOREIGN PATENT DOCUMENTS

| JP | 2001024707 A | 1/2001 |
|---|---|---|
| JP | 2001134544 A | 5/2001 |
| JP | 2002062123 A | 2/2002 |
| JP | 2002077277 A | 3/2002 |
| JP | 2003030775 A | 1/2003 |
| JP | 2003309597 A | 10/2003 |
| WO | 2008117787 A | 10/2008 |

OTHER PUBLICATIONS

International Search Report for PCT/JP2010/001107 mailed Mar. 16, 2010.
Y. Shiraishi, "Database Technologies for Sensor Networks", IPSJ Magazine, vol.47, No. 4, Apr. 2006, pp. 387-393.
K. Kida et al., "Development and Evaluation of High Performance Floating Car Data System Based on Data-stream Processing", IPSJ SIG Technical Reports, 2008-ITS-34, Sep. 10, 2008, pp. 1-8.

* cited by examiner

*Primary Examiner* — Belix M Ortiz Ditren

(57) ABSTRACT

An analysis preprocessing system is provided which is capable of, when large amounts of data are received from a large number of data generation sources, rapidly passing those data to means for analyzing the data in order of time of generation thereof. Data acquisition means 71 acquires a data group generated by a plurality of data generation sources. Data clipping means 72 clips each data from the data group. Rearrangement control means 73 retains each clipped data therein, selects data generated prior to the corresponding data when data from a delay maximum data generation source is detected, and rearranges the selected data in order of time of generation thereof. A data storage buffer 74 stores the data rearranged in order of time of generation thereof. Analysis data determination means determines an analysis data group which is a set of data used for analysis, from the data stored in the data storage buffer 74.

16 Claims, 32 Drawing Sheets

FIG. 4

| DATE AND TIME | VEHICLE ID | LATITUDE | LONGITUDE | SPEED |
|---|---|---|---|---|
| 2008/7/20 12:00:00 | CID0001 | 35.000 | 135.000 | 60.0 |

FIG. 5

| | | | | | | |
|---|---|---|---|---|---|---|
| 106 | HEADER | 2008/7/20 12:00:00 | CID0001 | 35.000 | 135.000 | 60.0 |
| 107 | DELIMITER | 2008/7/20 12:00:01 | CID0002 | 35.900 | 135.700 | 30.0 |
| 107 | DELIMITER | 2008/7/20 12:00:03 | CID0003 | 35.800 | 135.600 | 0.0 |

FIG. 8

| 2008/7/20 12:00:00 | CID0001 | 35.000 | 135.000 | 60.0 |

| 2008/7/20 12:00:01 | CID0002 | 35.900 | 135.700 | 30.0 |

| 2008/7/20 12:00:03 | CID0003 | 35.800 | 135.600 | 0.0 |

FIG. 9

| 2008/7/20 12:00:00 | CID0001 | 35.000 | 135.000 | 60.0 | 2008/7/20 12:00:10 |

| 2008/7/20 12:00:01 | CID0002 | 35.900 | 135.700 | 30.0 | 2008/7/20 12:00:10 |

| 2008/7/20 12:00:03 | CID0003 | 35.800 | 135.600 | 0.0 | 2008/7/20 12:00:10 |

RECEPTION TIME

FIG. 15

DATA GENERATION TIME

| TIME | 9 | 8 | 7 | 6 | 5 | 4 | 3 | 2 | 1 |
|---|---|---|---|---|---|---|---|---|---|
| TIME SERIES DATA GENERATION SOURCE A | (9) | | | (6) | | (4) | | | |
| TIME SERIES DATA GENERATION SOURCE B | | | (7) | | (5) | | | (2) | |
| TIME SERIES DATA GENERATION SOURCE C | | (8) | | | | | (3) | | (1) |

FIG. 16

DATA RECEPTION TIME

| TIME | 11 | 10 | 9 | 8 | 7 | 6 | 5 | 4 | 3 | 2 | 1 |
|---|---|---|---|---|---|---|---|---|---|---|---|
| TIME SERIES DATA GENERATION SOURCE A | | (9) | | | (6) | | (4) | | | | |
| TIME SERIES DATA GENERATION SOURCE B | (7) | | (5) | | | (2) | | | | | |
| TIME SERIES DATA GENERATION SOURCE C | | (8) | | | | | (3) | | (1) | | |

FIG. 17

| TIME<br>DATA RECEPTION TIME | 11 | 10 | 9 | 8 | 7 | 6 | 5 | 4 | 3 | 2 | 1 |
|---|---|---|---|---|---|---|---|---|---|---|---|
| TIME SERIES DATA GENERATION SOURCE A | | (9) | | | (6) | | (4) | | | | |
| TIME SERIES DATA GENERATION SOURCE B | (7) | | (5) | | | | | | | | |
| TIME SERIES DATA GENERATION SOURCE C | | (8) | | | | | (3) | | | | |

FIG. 18

| DATA RECEPTION TIME | | | | | | | | | | | | |
|---|---|---|---|---|---|---|---|---|---|---|---|
| TIME | 11 | 10 | 9 | 8 | 7 | 6 | 5 | 4 | 3 | 2 | 1 |
| TIME SERIES DATA GENERATION SOURCE A | | (9) | | | (6) | | | | | | |
| TIME SERIES DATA GENERATION SOURCE B | (7) | | | | | | | | | | |
| TIME SERIES DATA GENERATION SOURCE C | | (8) | | | | | | | | | |

FIG. 24

| ATTRIBUTE NAME | MINIMUM | MAXIMUM | DIFFERENCE |
|---|---|---|---|
| DATE AND TIME | ONE DAY AGO FROM PRESENT TIME | PRESENT TIME | WITHIN 1 HOUR |
| VEHICLE ID | CID0001 | CID9999 | NIL |
| LATITUDE | 34.000 | 36.000 | 0.01 OR LESS |
| LONGITUDE | 134.000 | 136.000 | 0.01 OR LESS |
| SPEED | 0 | 120 | 120 OR LESS |

FIG. 28

| DATE AND TIME | VEHICLE ID |
|---|---|
| 2008/7/20 12:00:00 | CID0001 |
| 2008/7/20 12:00:00 | CID0005 |
| 2008/7/20 12:01:00 | CID0001 |
| ... | ... |

US 8,489,620 B2

ANALYSIS PREPROCESSING SYSTEM, ANALYSIS PREPROCESSING METHOD AND ANALYSIS PREPROCESSING PROGRAM

TECHNICAL FIELD

The present invention relates to an analysis preprocessing system, an analysis preprocessing method and an analysis preprocessing program that perform preprocessing on data targeted for data analysis.

BACKGROUND ART

There is known a time series analyzing device that analyzes, in time series, data of logs or the like of a plurality of sensors and geographically distributed servers. In such a time series analyzing device, data targeted for analysis is temporarily stored as a database or a file and analyzed by batch processing or the like.

Such a database for accumulating data has been described in Non-patent Document 1. In a technology described in Non-patent Document 1, sensor data observed by a sensor network is accumulated in a single database on the network. For reference, a query is performed in SQL to refer to the data.

A description will be made of an example in which logs of apache (Apache Software Foundation) widely used as a Web server are analyzed. A plurality of Web servers are normally prepared to distribute access from clients. The respective Web servers independently store logs of access and errors as files. Upon setting the default of apache, error logs are recorded in a /usr/local/apache/logs/error. log file. When an analyzing device analyzes these logs, the analyzing device collects logs recorded in plural servers using an FTP (File Transfer Protocol) or the like to analyze the logs.

An example of a general configuration in which data to be analyzed is collected, is shown in FIG. 32. Respective Web servers 202 that serve as data generation sources are respectively accessed by clients 201 and generate data (logs). The Web servers 202 transmit the logs to a log collecting means 203. When receiving the data therein, the log collecting means 203 stores the data as a database or a file in storing means. Then, the log collecting means 203 converts the data into data form for data analysis and passes it to a data analyzing device 204. The data analyzing device 204 performs a data analysis.

Incidentally, the data are not necessarily transmitted from the plural Web servers 202 to the log collecting means 203 in order of time of generation thereof. When it is necessary that the data are arranged in time series order upon their analyses, the log collecting means 203 rearranges the data in time series order and passes the same to the data analyzing device 204.

As a simple configuration for achieving a configuration in which data generation sources (the Web servers 202 in the example shown in FIG. 32) and a data analyzing device are respectively independently operated, there is mentioned a configuration in which generated data is stored as a database or file and the data analyzing device analyzes the data. In such a configuration that the data generation sources and the data analyzing device advance processing asynchronously while communicating with each other, both need to determine the presence or absence of a communication request from the other party. This leads to a complicated system. To avoid such a complicated operation, such a configuration that generated data is stored as a database or file, has been adopted.

A license-free library usable for a process for transmitting data from data generation sources, a process for receiving the data and a process for temporarily storing the received data, exists in large numbers. For example, an FTP server may be used when a file is transferred. An ODBC (Open Database Connectivity) driver may be used at a database. In terms of the ability to use such a library, such a configuration that the generated data is stored as the database or file has been adopted.

A configuration has been described in Patent Document 1 in which data measured by a plurality of sensors such as vibration sensors, pulse sensors, etc. is collected by a microcomputer, and the microcomputer outputs data to a PDA or the like. The microcomputer performs filtering processing aiming at eliminating a disturbance signal, accumulating processing in second/minute units, etc. on original data of a biological signal to thereby generate processed data. The microcomputer transmits the processed data to the PDA. It has been described in Patent Document 1 that when it is determined that no fluctuation occurs in measured data and a subject to be examined is in a state in which a biological signal is not yet to be measured, the operation of measuring the biological signal is awaited until a predetermined time elapses.

An arbitration device for avoiding competition that occurs due to the issuance of a data transfer request from two or more input devices to the same output device has been described in Patent Document 2. Patent Document 2 has described that a data transfer request highest in priority and oldest in time is specified out of a plurality of data transfer requests for the output device, and a data transfer to the output device is permitted.

It has been described in Patent Document 3 that when received data is received in the follow-on stream, the follow-on data stream is interrupted. It has also been described that filtering about a customer organization and a user organization is performed on a data stream.

A charged beam length measuring device has been described in Patent Document 4, which deletes measured data where the absolute value of a difference between first measured data and second measured data exceeds a predetermined value.

CITATION LIST

Patent Literature

Patent Document 1 JP-A-2003-30775 (Paragraphs 0037, 0048-0050 and 0063, and FIG. 1)
Patent Document 2 JP-A-2003-309597 (Paragraph 0013)
Patent Document 3 JP-A-2002-77277 (Paragraphs 0033 and 0035)
Patent Document 4 JP-A-2002-62123 (Paragraph 0021)

Non-Patent Literature

Non-patent Document 1 Yoh Shiraishi, "Database Technologies for Sensor Networks", Information Processing, Information Processing Society of Japan, Vol. 47, No. 4 (20060415), pp. 387-393, 2006

SUMMARY OF INVENTION

Technical Problem

In a configuration (the configuration shown in FIG. 32, for example) in which a plurality of data generation sources such as sensors, Web servers or the like exist, and data thereof is temporarily stored as databases or files and passed to a data analyzing device, there is a possibility that when the number of the data generation sources increases, processing by means for collecting data will be insufficient due to the concentration of access to the means (the log collecting means 203 shown in FIG. 32, for example) for collecting the data. There is a possibility that when, for example, data is stored as a database or file, the processing of storing data and the like will be insufficient because I/O for data storage is low in speed.

When the pieces of data are rearranged in time series order and passed to the data analyzing device, each collected data may be sorted based on the time of generation of the data. While a high-speed algorithm such as quick sort or the like is known as sort processing, the average amount of calculation is expressed in $o$ (n×log (n)). When the amount of data increases, the amount of calculation becomes large even if the high-speed algorithm is adopted. Therefore, when the amount of data that the data collecting means has stored therein is large, the processing time for arranging the data in time-series order is taken.

Therefore, the present invention aims to provide an analysis preprocessing system, an analysis preprocessing method and an analysis preprocessing program each capable of, when large amounts of data are received from a large number of data generation sources, rapidly passing those data to means for analyzing the data in order of time of generation thereof.

Solution to Problem

An analysis preprocessing system according to the present invention includes: data acquisition means which acquires a data group generated by a plurality of data generation sources; data clipping means which clips each data from the data group acquired by the data acquisition means; rearrangement control means which retains each data clipped by the data clipping means, selects data generated prior to the corresponding data when data from a delay maximum data generation source is detected, and rearranges the selected data in order of time of generation thereof, the delay maximum data generation source corresponding to a data generation source at which a time from the generation of data to the acquisition of the data by the data acquisition means becomes maximum; a data storage buffer which stores the data rearranged in order of time of generation thereof; analysis data determination means which determines an analysis data group which is a set of data used for analysis, from the data stored in the data storage buffer; and analysis data output means which transmits the analysis data group to data analyzing means for analyzing data.

Further, an analysis preprocessing method according to the present invention includes the steps of: acquiring a data group generated by a plurality of data generation sources; clipping each data from the acquired data group; retaining each clipped data, selecting data generated prior to the corresponding data when data from a delay maximum data generation source is detected, and rearranging the selected data in order of time of generation thereof, the delay maximum data generation source corresponding to a data generation source at which a time from the generation of data to the acquisition of the data becomes maximum; storing the data rearranged in order of time of generation thereof in a data storage buffer; determining an analysis data group which is a set of data used for analysis, from the data stored in the data storage buffer; and transmitting the analysis data group to data analyzing means for analyzing data.

Furthermore, an analysis preprocessing program according to the present invention causes a computer to execute: data acquisition processing for acquiring a data group generated by a plurality of data generation sources; data clipping processing for clipping each data from the data group acquired by the data acquisition processing; rearrangement control processing for retaining each data clipped by the data clipping processing, selecting data generated prior to the corresponding data when data from a delay maximum data generation source is detected, and rearranging the selected data in order of time of generation thereof, the delay maximum data generation source corresponding to a data generation source at which a time from the generation of data to the acquisition of the data by the data acquisition processing becomes maximum; data storage processing for storing the data rearranged in order of time of generation thereof in a data storage buffer; analysis data determination processing for determining an analysis data group which is a set of data used for analysis, from the data stored in the data storage buffer; and analysis data output processing for transmitting the analysis data group to data analyzing means for analyzing data.

Advantageous Effect of the Invention

According to the present invention, when large amounts of data are received from a large number of data generation sources, those data can be rapidly passed to means for analyzing the data in order of time of generation thereof.

BRIEF DESCRIPTION OF DRAWINGS

FIG. 4 It depicts an explanatory diagram showing an example of data generated by a time series data generation source.

FIG. 5 It depicts an explanatory diagram illustrating an example of data transmitted by data transmitting means.

FIG. 8 It depicts an explanatory diagram showing an example of clipped data.

FIG. 9 It depicts an explanatory diagram showing an example of data to which the reception time thereof is added.

FIG. 15 It depicts an explanatory diagram showing an example of a time table indicative of when any data is generated in any time series data generation source.

FIG. 16 It depicts an explanatory diagram illustrating an example of a time table indicative of timing at which data is input to stream data generating means.

FIG. 17 It depicts an explanatory diagram showing that some pieces of data are deleted from the time table illustrated by an example in FIG. 16.

FIG. 18 It depicts an explanatory diagram showing that some pieces of data are deleted from the time table illustrated by an example in FIG. 17.

FIG. 24 It depicts an explanatory diagram showing an example of a reference stored in effective data defining means.

FIG. 28 It depicts an explanatory diagram showing an example of data identification information.

DESCRIPTION OF EMBODIMENTS

Embodiments of the present invention will hereinafter be explained with reference to the accompanying drawings.

Embodiment 1

Figure 1:
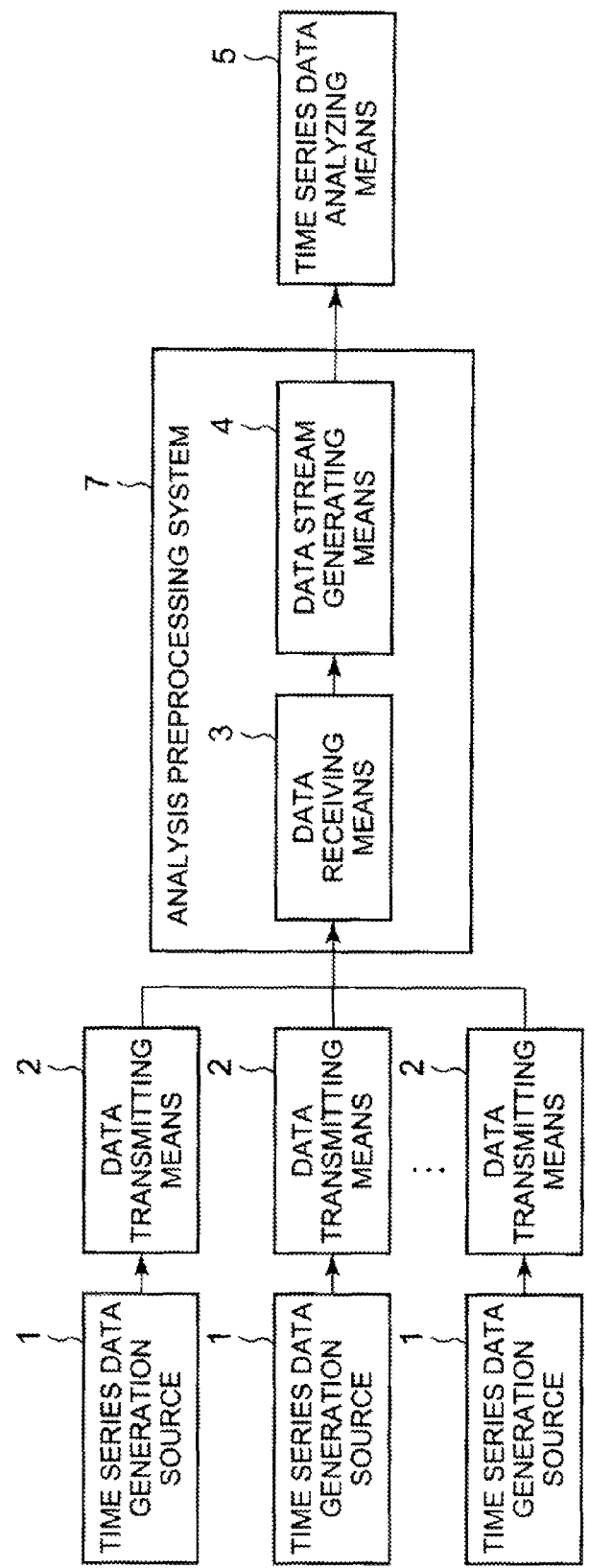
FIG. 1 It depicts a block diagram showing an example of an analysis preprocessing system of a first embodiment of the present invention.

FIG. 1 is a block diagram showing an example of an analysis preprocessing system of a first embodiment of the present invention. The analysis preprocessing system 7 of the present invention is equipped with data receiving means 3 which receives data generated by a time series data generation source 1, and data stream generating means 4 which processes the received data and transmits the same to time series data analyzing means 5.

The time series data generation source 1 is a data generation source which sequentially generates data with the elapse of time. Data transmitting means 2 transmits the data generated by the time series data generation source 1 to the analysis preprocessing system 7. The time series data analyzing means 5 performs analysis processing on the data input from the data stream generating means 4. As shown in FIG. 1, the time series data generation source 1 and the data transmitting means 2 may be provided in plural form.

The data receiving means 3 receives the data generated by the time series data generation sources 1 from the respective data transmitting means 2. At this time, the data receiving means 3 does not necessarily receive the data generated by the individual time series data generation sources in order of time of generation thereof, due to factors such as the differences in communication situation between the individual time series data generation sources 1 and the data receiving means 3.

The data stream generating means 4 rearranges the respective data received by the data receiving means 3 in order of time series (i.e., in order of time of data generation). Then, the data stream generating means 4 determines, for each analysis in the time series data analyzing means 5, a set of data targeted for one analysis from the data rearranged in time series order, and transmits it to the time series data analyzing means 5. The time series data analyzing means 5 performs an analysis using the data.

Incidentally, the time series data generation sources 1 and the data transmitting means 2 may be included in the analysis preprocessing system. Likewise, the time series data analyzing means 5 may be included in the analysis preprocessing system.

Figure 2:
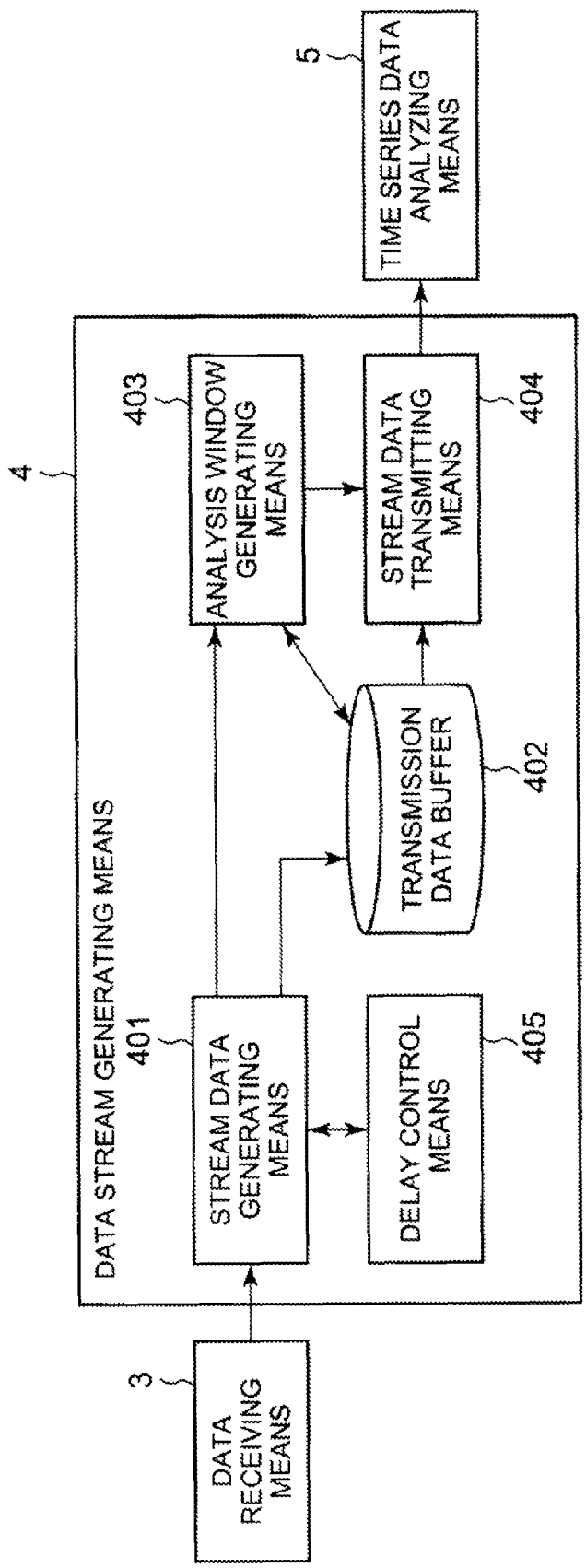
FIG. 2 It depicts a block diagram illustrating a configuration example of data stream generating means.

FIG. 2 is a block diagram showing a configuration example of the data stream generating means 4. The same reference numerals as those shown in FIG. 1 are respectively attached to the same elements as those shown in FIG. 1. The data stream generating means 4 is equipped with stream data generating means 401, delay control means 405, transmission data buffer 402, analysis window generating means 403 and stream data transmitting means 404. The stream data generating means 401 converts each data received by the data receiving means 3 into a data format for analysis, and inputs the same to the delay control means 405. The delay control means 405 rearranges the individual data obtained by the format conversion, in time series order. At this time, when the delay control means 405 specifies the time series data generation source at which a time from the data generation to the data reception by the data receiving means 3 is the longest, and upon receiving data generated by that time series data generation source, the delay control means 405 gives back the respective data each generated earlier than the received data, to the stream data generating means 401 in order. Incidentally, the time from the data generation to the data reception by the data receiving means 3 is described as a delay. The stream data generating means 401 stores the data rearranged in time series order by the delay control means 405 in the transmission data buffer 402. The transmission data buffer 402 is a memory that temporarily stores the data. When notified of the registration of the data in the transmission data buffer 402, the analysis window generating means 403 generates a set of data to be analyzed at a time by the time series data analyzing means 5. The stream data transmitting means 404 transmits data from the transmission data buffer 402 to the time series data analyzing means 5 in accordance with a command from the analysis window generating means 403.

Figure 3:
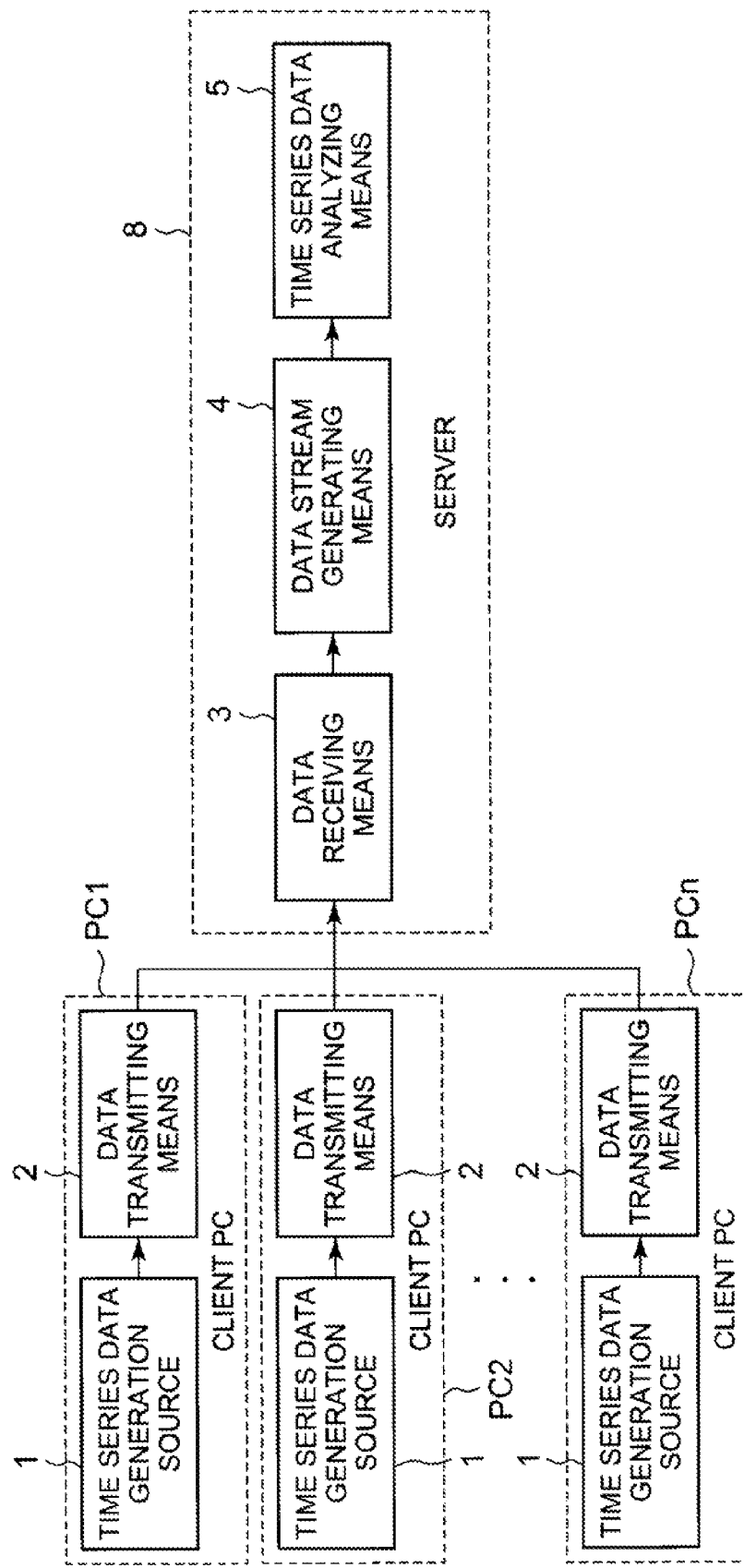
FIG. 3 It depicts an explanatory diagram showing one example of a physical configuration of the analysis preprocessing system.

FIG. 3 is an explanatory diagram showing one example of a physical configuration of the analysis preprocessing system. Typically, the time series data generation sources 1 exist in physically-dispersed positions, and a server collects data and performs their analyses. In the example shown in FIG. 3, n clients PC1, PC2, . . . , PCn are each equipped with time series data generation sources 1 and data transmitting means 2. Each client is an information processing device such as a PC (Personal computer) or the like. Also, in the example shown in FIG. 3, a server PC8 that performs a data analysis is provided with data receiving means 3, data stream generating means 4 and time series data analyzing means 5.

The physical configuration shown in FIG. 3 is however illustrated by an example, but is not limited to the example shown in FIG. 3. For example, a plurality of time series data generation sources may be achieved by one computer. The data receiving means 3, the data stream generating means 4 and the time series data analyzing means 5 may each be achieved by different computers. By which devices the respective means should be achieved may appropriately be determined according to the number of generated data, computer's throughput, and the physical decentralized situations of the time series data generation sources 1. There may be such a configuration that the time series data generation sources 1, the data transmitting means 2, the data receiving means 3, the data stream generating means 4 and the time series data analyzing means 5 are provided in one computer.

A following description will be made of, as an example, the case where a plurality of clients generate data and transmit the data to the server PC, and the server PC performs their preprocessing and analyses.

The details of the respective means will be explained.

Each of the time series data generation sources 1 continuously generates data to be analyzed. The time series data generation source 1 is a sensor and may continuously generate sensor data to be analyzed. The time series data generation source 1 is a server device such as a Web server or the like and may continuously generate logs to be analyzed. The respective time series data generation sources 1 include the time of data generation in the generated data. The present embodiment will explain, as an example, the case where the time series data generation sources 1 are mounted on vehicles (probe cars) and are, for example, sensors which measure their speed, positions, heading directions and the like. Tens of thousands of probe cars are driven, data from sensors of the respective probe cars are collected and then analyzed, so that Jam information can be generated. The present invention is however applicable even to other than the data analyses of the probe cars. Although there is shown in FIG. 3 the case where each PC operates as the time series data generation source 1 and the data transmitting means 2, base stations provided separately from the probe cars correspond to the data transmitting means 2 in the present example.

FIG. 4 is an explanatory diagram showing an example of data generated by a sensor (the time series data generation source 1) provided in each individual probe car. In the present example, the time series data generation source 1 provided in each individual probe car generates data including the date and time, vehicle ID, latitude, longitude and speed. The date and time are date and time of generation of data. The vehicle ID is ID (identification information) of each probe car equipped with the time series data generation source 1. The respective probe cars are each assigned unique vehicle ID. The latitude is latitude of a position of each probe car, and the longitude is longitude of a position of each probe car. The speed is speed of each probe car and is speed per hour in the example shown in FIG. 4. Thus, the data shown in FIG. 4 is data generated at "2008/7/20/12:00". A probe car "CID0001" indicates that it exists at "latitude 35.000" and "longitude 135.000" and is running at a speed of 60.0 km per hour. In the present example, a set of the date and time, vehicle ID, latitude, longitude and speed is defined as one datum.

Each of the data transmitting means 2 transmits data generated by the time series data generation source 1 to the analysis preprocessing system (server PC). In the present example, the base station provided separately from the probe car corresponds to the data transmitting means 2. Transmitting means (not shown) that transmits data to the base station is also provided in each probe car. The transmitting means (not shown) provided in each probe car transmits data to the base station (the data transmitting means 2) via a wireless LAN. The base station (the data transmitting means 2) transmits the data to its corresponding server PC. The base station (the data transmitting means 2) is connected to its corresponding server PC via a wired LAN, for example. The present invention is applicable even to the case in which data other than the data collected from the probe cars is targeted. A data transmission method of the data transmitting means 2 is not limited in particular. Data may be transmitted using, for example, FTP (FILE TRANSFER PROTOCOL RFC 959).

FIG. 5 is an explanatory diagram showing an example of data transmitted by the data transmitting means 2. The data transmitting means 2 may desirably transmit a fixed number of data in a lump without transmitting the individual data to the server PC individually. Transmitting the plural pieces of data in a lump in such a way enables a reduction in communication cost. The data transmitting means 2 links data by delimiters 107 and adds a header 106 thereto, then transmitting the data to the server PC as illustrated by an example in FIG. 5. The header 106 is a header defined by a communication protocol and includes, for example, parameters such as the size of transmission data. The delimiter 107 is information that indicates the boundary between individual data.

The data receiving means 3 receives the data (e.g., the data illustrated by the example in FIG. 5) transmitted by the data transmitting means 2 therein. The data receiving means 3 may receive the data in accordance with the same communication protocol as that of the data transmitting means 2. The data may be received by the FTP, for example. The data receiving means 3 adds a reception time (a present time when receiving the data) to the header 106 (refer to FIG. 5) of the data received from the data transmitting means 2.

Figure 6:
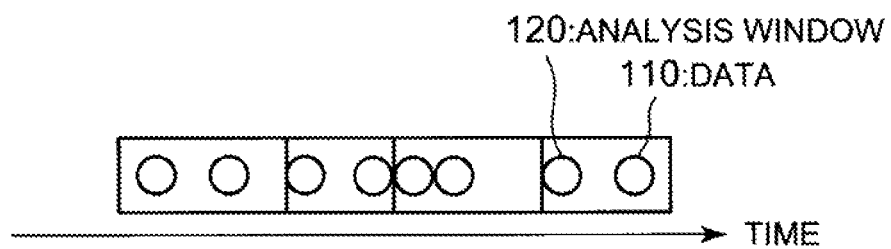
FIG. 6 It depicts an explanatory diagram typically showing an analysis window.

The data stream generating means 4 divides the data received by the data receiving means 3 into individual data. The data stream generating means 4 rearranges the individual data in time series order. Specifically, when the data stream generating means 4 specifies the time series data generation source largest in delay (time from the data generation to the data reception by the data receiving means 3), and detects data generated by that time series data generation source, the data stream generating means 4 stores data generated earlier than the detected data in the transmission data buffer 402 in order, to thereby rearrange the data. Further, the data stream generating means 4 determines a set (analysis window) of data to be analyzed by the time series data means 5. Normally, the time series data analyzing means 5 repeats the analysis of the set of data without analyzing the data one by one. The analysis window is a set of data to be analyzed at one analysis. FIG. 6 is an explanatory diagram typically showing an analysis window. Respective round marks shown in FIG. 6 each indicate data generated with the elapse of time. A set of the data 110 corresponds to an analysis window 120. The time series data analyzing means 5 performs one analysis processing using one analysis window. The data stream generating means 4 performs a process for rearranging data in time series order and determining an analysis window from the data and transmits the analysis window to the time series data analyzing means 5.

As the type of the analysis window, there may be mentioned, for example, a Time-Base Window and a Topple-Base Window. The Time-Base Window is an analysis window in which pieces of data that belong to within a predetermined time are aggregated for each predetermined time. The Topple-Base Window is an analysis window in which pieces of data are specified by a predetermined number in time-series order and complied. FIG. 6 shows an example of the Topple-Base Window and shows the case in which analysis windows are generated by two data.

The data stream generating means 4 defines ID (window ID) for identifying each analysis window every analysis window, interpolates the window ID into each data and passes the same to the time series data analyzing means 5.

Figure 7:
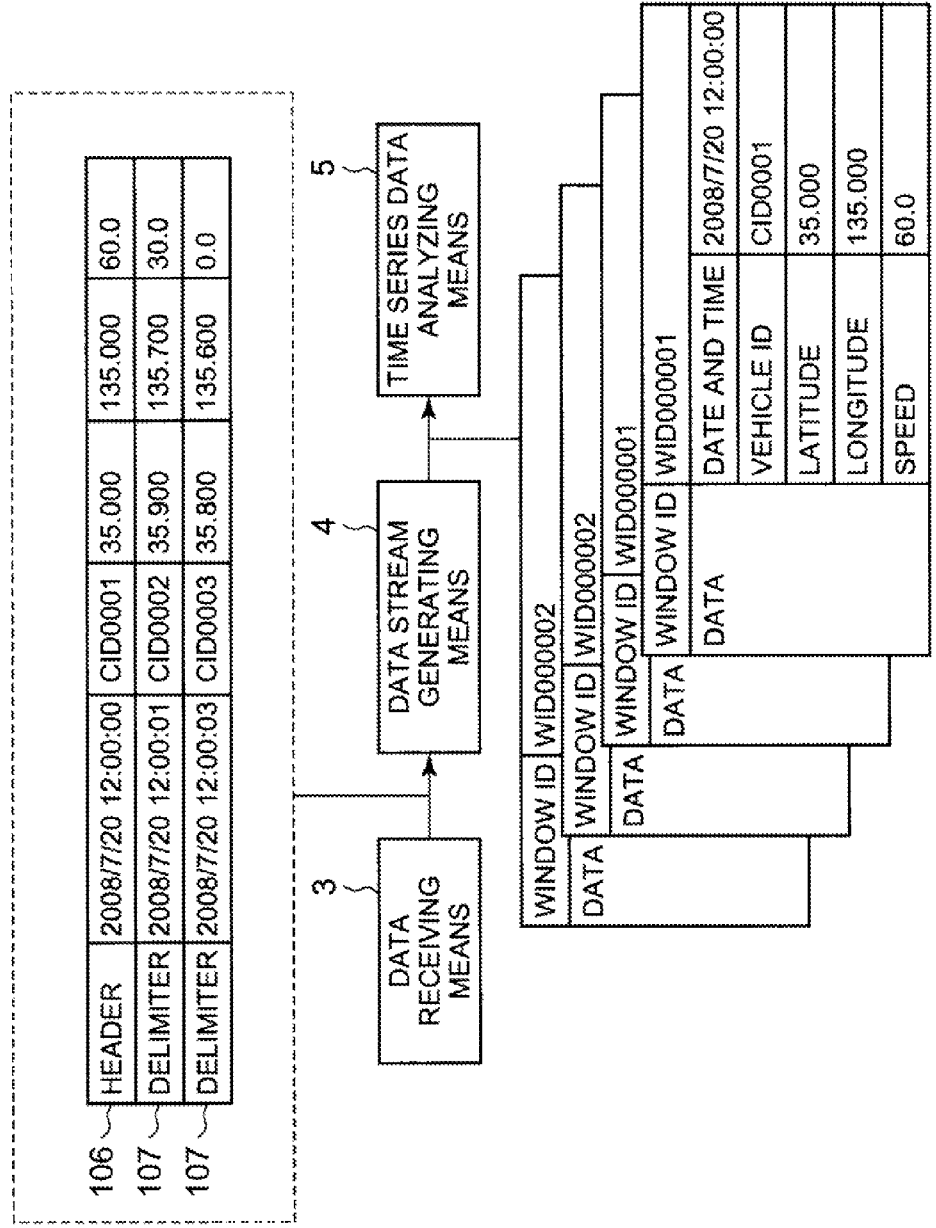
FIG. 7 It depicts an explanatory diagram showing an example of input/output of the data stream generating means.

FIG. 7 is an explanatory diagram showing an example of the input/output of the data stream generating means 4. A plurality of data linked by delimiters 107 and including a communication header 106 are inputted from the data receiving means 3 to the data stream generating means 4. The reception time at which the data receiving means 3 receives data is added to the header 106. The data stream generating means 4 clips the individual data from the input data, rearranges the individual data in time series order, allocates window ID to the data and passes the data assigned the window ID to the time series data analyzing means 5. The data stream generating means 4 allocates the common window ID to the respective data each included in one analysis window. Sets of the data to which the common window ID is allocated are analyzed simultaneously in one analysis. The individual data assigned the window ID is data generated by the time series data generation sources 1. In the present example, each data contains the date and time, vehicle ID, latitude, longitude and speed.

The respective elements provided in the data stream generating means 4 will be explained with reference to FIG. 2 and the like. The stream data generating means 401 performs format conversion on the data that the data receiving means 3 receives from each data transmitting means 2 (not shown in FIG. 2 and refer to FIG. 1) to divide the same into each individual data. The stream data generating means 401 may determine a header 106 and delimiters 107 (refer to FIG. 7) to clip data between the header 106 and the delimiters 107 and data between the delimiters 107. The format of the data has been standardized by RFC (Request for Comments) or the like. When the received data conforms to the specifications of RFC, a boundary between a header and data and a delimiter between data may be determined in accordance with the specifications to clip each data. FIG. 8 shows an example of data clipped by the stream data generating means 401. When the data illustrated by the example in FIG. 5 is input, the stream data generating means 401 clips three data as shown in FIG. 8.

Further, the stream data generating means 401 adds information about the reception time added to the header 106, to each clipped data. The three pieces of data shown in FIG. 8 will be explained by way of example. Each reception time is added thereto so that pieces of data illustrated by an example in FIG. 9 are obtained. The stream data generating means 401 inputs the respective data (refer to FIG. 9) each added with the reception time, to the delay control means 405. Further, when the delay control means 405 has rearranged the data in time series order, the stream data generating means 401 stores the rearranged data in the transmission data buffer 402. The reception time is used for determining a delay and not used subsequently. Therefore, when storing the data in the transmission data buffer 402, the stream data generating means 401 deletes the reception time thereof. Incidentally, the stream data generating means 401 may store the data without deleting the reception time thereof in the transmission data buffer 402.

The delay control means 405 retains each data clipped by the stream data generating means 401. The delay control means 405 specifies a data generation source that becomes maximum in a delay by referring to the date and time (date and time of data generation) contained in the data and the reception time thereof. When detecting data that is generated by the data generation source out of the data input from the stream data generating means 401, the delay control means 405 extracts the data generated prior to the detected data, from the retained data, rearranges the data in time series order and inputs the same to the stream data generating means 401. A detailed configuration of the delay control means 405 will be described later with reference to FIG. 11.

Figure 10:
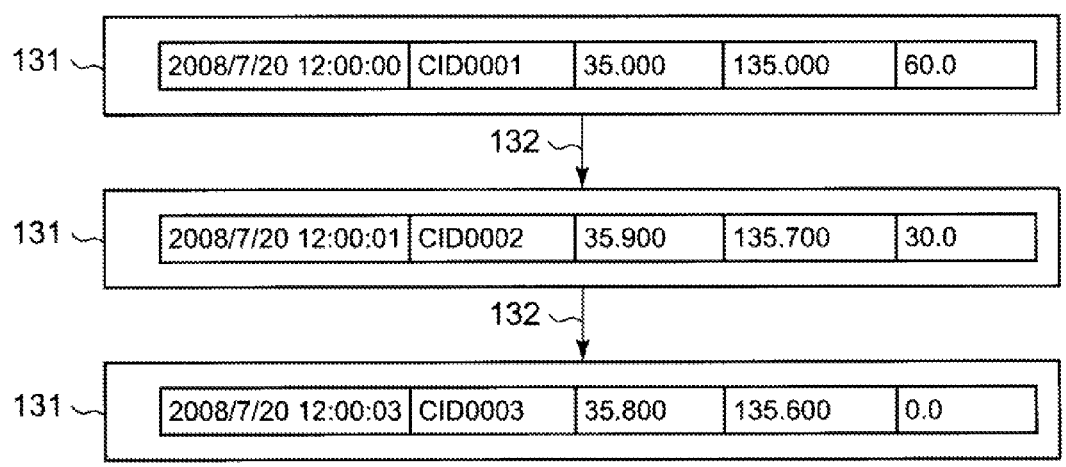
FIG. 10 It depicts a typical diagram illustrating an example of a memory image in transmission data buffer.

The transmission data buffer 402 is a memory that stores the rearranged data therein. FIG. 10 is a typical diagram showing an example of a memory image in the transmission data buffer 402. FIG. 10 illustrates, by way of example, the case where a list structure is adopted. One datum is stored in a memory area 131 that stores one datum therein. Pointers 132 that link respective memory areas are defined. The stream data generating means 401 notifies the analysis window generating means 403 of the pointers to the memory areas, when the respective data is stored. Tracing the pointers enables access to the respective data in sequence. The form of storing the data in the transmission data buffer 402 is however not limited to the example of FIG. 10. For example, the transmission data buffer 402 may store data therein in a table structure instead of the list structure.

The analysis window generating means 403 receives notification of each pointer to the memory area with the data stored therein at the timing at which the stream data generating means 401 stores the data in the transmission data buffer, and thereby generates an analysis window based on the pointer. Specifications of the analysis window have been set to the analysis window generating means 403 in advance. The specifications of the analysis window include the type of the analysis window, and the size of the window. As the type of the analysis window, a time-based window in which an analysis is conducted, or a topple-based window in which an analysis is done is determined. As the window size, time is determined in the case of the time-based window, and the number of data is determined in the case of the topple-based window.

The analysis window generating means 403 generates an analysis window in accordance with the prescribed specifications. For example, assume that the analysis is determined to be conducted by the time-based window and the time is defined as the window size. In this case, when generating the analysis window, the analysis window generating means 403 stores therein the date and time of generation of the analysis window and adds a window size to the date and time to thereby calculate the timing at which the next analysis window is generated. When the analysis window generating means 403 receives the notification of the corresponding pointer from the stream data generating means 401 along with the addition of new data, the analysis window generating means 403 obtains access to a field at the date and time for data in a memory area indicated by the notified pointer. The analysis window generating means 403 determines whether the date and time exceeding the timing at which the next analysis window is generated, is being stored. When the date and time that exceed the timing at which the next analysis window generated, is being stored, the analysis window generating means 403 allocates new window ID to the respective data stored in the transmission data buffer to thereby define it as one analysis window of those, and issues a command for transmission of a set (analysis window) of the data to the stream data transmitting means 404.

Assume that the analysis is determined to be conducted in the topple-based window, and the number of data is defined as the window size, for example. Each time the notification of each pointer is received with the addition of new data, the analysis window generating means 403 counts the number of times its notification is received. The number of times the notification is received means the number of data stored in the transmission data buffer 402. When receiving the notification corresponding to the number defined by the window size, the analysis window generating means 403 allocates new window ID to the respective data stored in the transmission data buffer to thereby define it as one analysis window of those, and issues a command for transmission of a set (analysis window) of the data to the stream data transmitting means 404. At this time, a count value of the number of times the notification is received is initialized to 0.

Incidentally, even in both cases of the time-based window and the topple-based window, a set of pointers to memory areas that store respective data each belonging to a newly-defined analysis window is issued as a command for transmission of a data set.

When receiving the command for the transmission of the data set (i.e., each pointer to the memory area that stores data to be transmitted) from the analysis window generating means 403, the stream data transmitting means 404 transmits the data stored in the memory area indicated by each pointer to the time series data analyzing means 5. When transmitting the data, the stream data transmitting means 404 deletes the data from the transmission data buffer 402.

The time series data analyzing means 5 analyzes the data received from the data stream generating means 4. The time series data analyzing means 5 is provided with storing means (not shown) for storing the data received from the data stream generating means 4 and stores the received data in the storing means. The time series data analyzing means 5 reads the data added to which the same window ID is assigned and performs analysis on the data. The read data is deleted from the storing means. When data of each probe car is analyzed, the time series data analyzing means 5 matches the data of each probe car with a road map, for example and generates jam information indicative of at which position a jam occurs, from the average speed of the probe car. This processing is performed at predetermined intervals (e.g., intervals of 5 minutes). In this case, the analysis may be determined to be done in the time-based window. The processing to be performed by the time series data analyzing means 5 may be determined according to the data generated by each data generation source 1 and analysis purposes, and is not limited to specific analysis processing.

Figure 11:
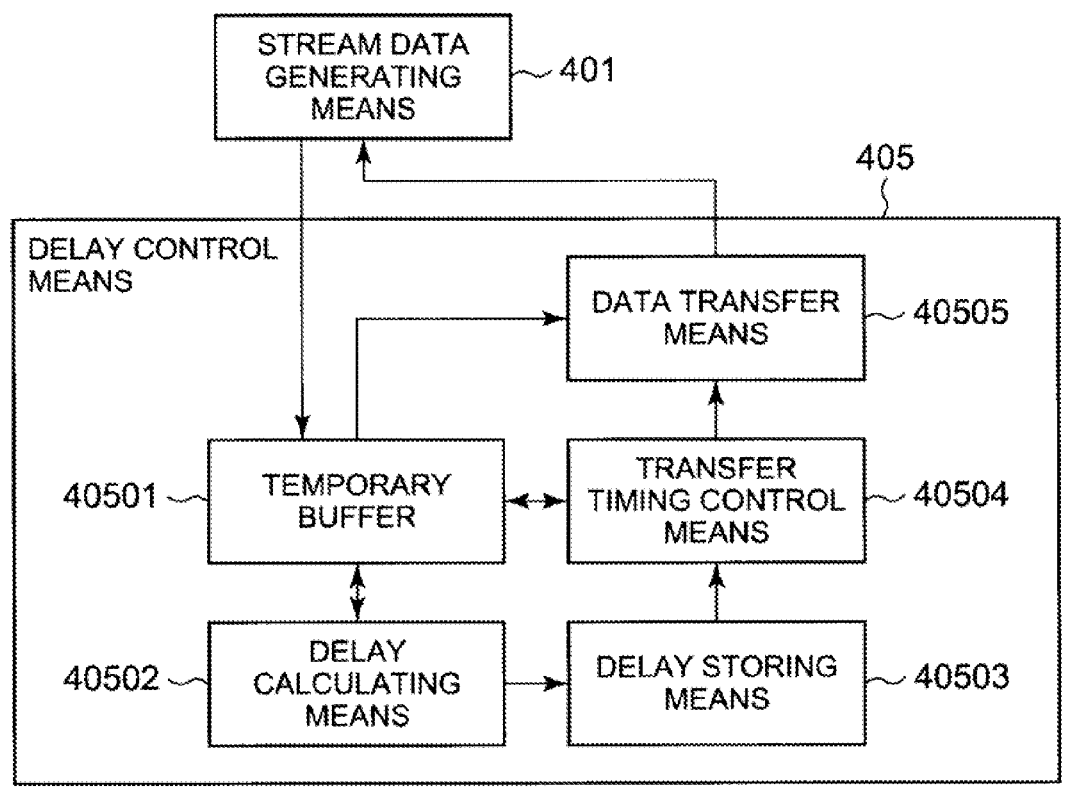
FIG. 11 It depicts a block diagram showing a configuration example of delay control means.

FIG. 11 is a block diagram showing a configuration example of the delay control means 405. The delay control means 405 is equipped with a temporary buffer 40501, delay calculating means 40502, delay storing means 40503, transfer timing control means 40504 and data transfer means 40505.

The temporary buffer 40501 is a memory that stores each data clipped by the stream data generating means 401. The stream data generating means 401 stores each clipped data that has been added with the reception time (refer to FIG. 9) in the temporary buffer 40501. The temporary buffer 40501 is provided separately from the transmission data buffer 402. The temporary buffer 40501 may be a memory similar to the transmission data buffer 402. The order of arrangement of the data stored in the temporary buffer 40501 may not be an order of data generation.

The delay calculating means 40502 calculates a difference (i.e., delay) between the date and time (date and time of data generation) contained in each data and its reception time for each time series data generation source by referring to each data stored in the temporary buffer. For example, the delay calculating means 40502 extracts the data one by one for each vehicle ID, from the data group stored in the temporary buffer, and calculates a delay.

The delay storing means 40503 is a memory that stores therein the delay set for each time series data generation source. When the delay is calculated for each time series data generation source, the delay calculating means 40502 stores each delay in correspondence with identification information (e.g., vehicle ID) of each time series data generation source in the delay storing means 40503. The form in which the delay storing means 40503 stores the identification information about each time series data generation source and the delay therein is not limited in particular. For example, it may be stored as an arrangement or a hash table.

The transfer timing control means 40504 specifies the time series data generation source that becomes maximum in a delay by referring to the delay set for each time series data generation source, which is stored in the delay storing means 40503. This time series data generation source is described as the delay maximum data generation source. When data is stored in the temporary buffer 40501, the transfer timing control means 40504 determines whether the data is of data generated by the delay maximum data generation source. When the data is found to be the data generated by the delay maximum data generation source, the transfer timing control means 40504 instructs the data transfer means 40504 to rearrange data generated prior to the data generated by the delay maximum data generation source.

The data transfer means 40505 reads, from the temporary buffer 40501, the data generated prior to the data that is generated by the delay maximum data generation source and newly added to the temporary buffer 40501, according to the instructions issued from the transfer timing control means 40504. Then, the data transfer means 40505 arranges the data in order of time of generation thereof and transfers the same to the stream data generating means 401. In other words, the data transfer means 40505 returns the data to the stream data generating means 401.

In the present embodiment, the data receiving means 3 and the stream data generating means 401, delay control means 405 (delay calculating means 40502, transfer timing control means 40504 and data transfer means 40505), analysis window generating means 403 and stream data transmitting means 404 of the data stream generating means 4 are achieved by, for example, a CPU of a computer operating in accordance with an analysis preprocessing program. In this case, the analysis preprocessing system is equipped with program storing means (not shown) that stores the analysis preprocessing program. The CPU reads the program and may operate as the data receiving means 3 and the stream data generating means 401, delay control means 405 (delay calculating means 40502, transfer timing control means 40504 and data transfer means 40505), analysis window generating means 403 and stream data transmitting means 404 of the data stream generating means 4. These respective means may be achieved by discrete dedicated circuits respectively.

The time series data generation sources 1, the data transmitting means 2 and the time series data analyzing means 5 are also achieved by a CPU operating in accordance with the program.

A description will next be made of operation.

Figure 12:
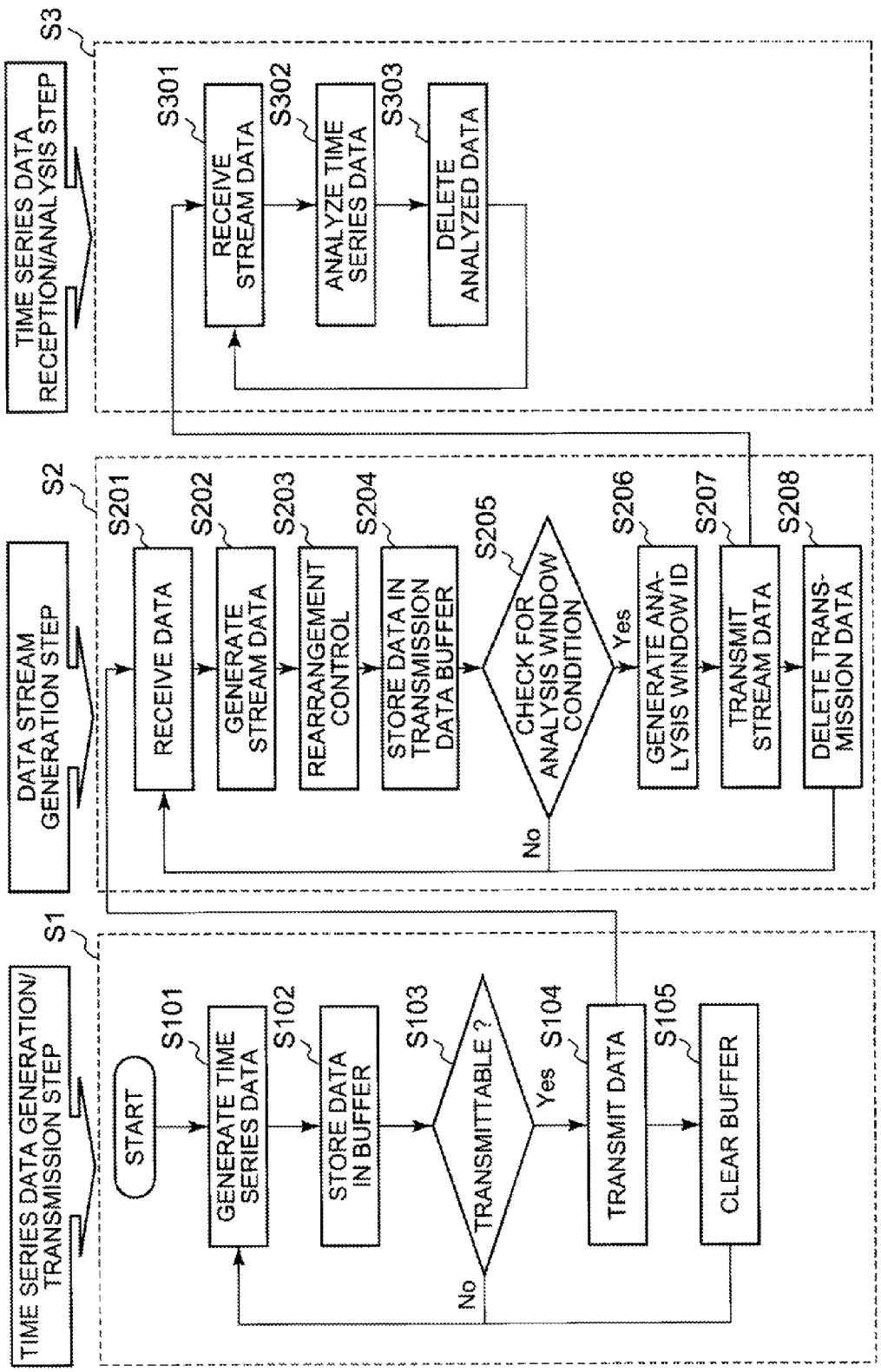
FIG. 12 It depicts a flowchart showing an example of the processing progress of the first embodiment of the present invention.

FIG. 12 is a flowchart showing an example of the processing progress of the first embodiment of the present invention. A process is descried as a time series data generation/transmission step (Step S1) in which the respective time series data generation sources 1 generate data and the data transmitting means 2 transmits the data to the analysis preprocessing system. A process is described as a data stream generation step (Step S2) in which the analysis preprocessing system (e.g., server PC) having received the data therein receives data, rearranges the same in time series order, stores the rearranged data in the transmission data buffer 402 and generates an analysis window. A process for analyzing the data by the time series data analyzing means 5 is described as a time series data reception/analysis step (Step S3). Steps S1, S2 and S3 are processes independent of one another and are carried out in parallel. That is, Steps S1, S2 and S3 are executed asynchronously.

At the time series data generation/transmission step (Step S1), the individual time series data generation sources 1 generate data continuously with the elapse of time (Step S101). The individual time series data generation sources 1 include the time of data generation (data generation time) in the generated data. The individual time series data generation sources 1 transmit the data to their corresponding data transmitting means 2, which store the data in a buffer (not shown) to transmit the data in a lump (Step S102). This buffer is a buffer for buffering the data on the data transmitting means 2 side. Each data transmitting means 2 determines whether the timing at which the data stored in the buffer is transmitted is reached (Step S103). If a predetermined number of data are stored, for example, the data transmitting means 2 may determine to transmit data. If the number of stored data does not reach the predetermined number, the data transmitting means 2 may determine not to transmit data. Alternatively, if a prescribed period has elapsed from the previous data transmission, the data transmitting means 2 may determine to transmit data. If the prescribed period does not elapse, the data transmitting means 2 may determine not to transmit data. When it is determined that the timing at which the data is transmitted is reached (Yes at Step S103), the data transmitting means 2 links the data and transmits the same to the analysis preprocessing system 7 (Step S104), where the transmitted data is deleted from the corresponding buffer (Step S105). When the timing at which the data is transmitted is not reached, Steps S101 and S102 are repeated.

Incidentally, when the time series data generation sources 1 and the data transmitting means 2 are achieved by the same device, the time series data generation sources 1 may execute the processes of Steps S101, S102, S103 and S105.

At the data stream generation step (Step S2), the data receiving means 3 receives the data transmitted by each data transmitting means 2 (Step S201). At this time; the data receiving means 3 adds information about the reception time to the header 106 (refer to FIG. 7) of each received data. The data receiving means 3 is also equipped with a buffer (not shown) and temporarily stores the received data in the buffer. The data receiving means 3 inputs the data in the buffer to the data stream generating means 4 in asynchronization with the data receiving timing. Therefore, Step S2 can be performed asynchronously with Step S1.

The stream data generating means 401 performs format conversion on the data input from the data receiving means 3 and clips the individual data from the linked data (Step S202). At this time, the stream data generating means 401 adds the information about the reception time contained in the header of each input data, to each clipped data. As a result, the data including the reception time can be obtained as illustrated by the example in FIG. 9. The stream data generating means 401 stores each data to which the reception time has been added, in the temporary buffer 40501 of the delay control means 405.

The delay control means 405 determines whether the data generated by the delay maximum data generation source is newly added to and stored in the temporary buffer 40501. When the data is additionally stored therein, the delay control means 405 executes a process (rearrangement control processing) for returning each data generated at the time before the above data to the stream data generating means 401 in order of time of data generation (Step S203). The details of the process of Step S203 will be described later.

When the pieces of data each arranged in order of time of its generation are input from the delay control means 405 at Step S203, the stream data generating means 401 deletes the information about the reception time from each data. The stream data generating means 401 deletes the reception time from each data illustrated by the example in FIG. 9, for example, and restores the so-processed data to the data illustrated by the example in FIG. 8. And the stream data generating means 401 stores the respective data (refer to FIG. 2) in order of time of generation thereof in the transmission data buffer 402 (Step S204). At this time, the stream data generating means 401 notifies the analysis window generating means 403 of a pointer to each memory area with the data stored therein.

When the pointer is notified to the analysis window generating means 403, the analysis window generating means 403 determines whether a condition for generating an analysis window is satisfied (Step S205). When analysis in a topple-based window is specified, for example, the analysis window generating means 403 determines whether the notification corresponding to the number of data defined by a window size is received. Alternatively, when analysis in a time-based window is specified, the analysis window generating means 403 determines whether a period defined by the window size elapses after the time of the previous generation of analysis window. When the condition for generating the analysis window is satisfied (Yes at Step S205), the analysis window generating means 403 adds common window ID to each data included in the analysis window and issues a command for transmission of the analysis window (Step S206). The stream data transmitting means 404 transmits a data group (i.e., analysis windows) to which the common window ID is allocated, to the time series data analyzing means 5 according to the transmission command (Step S207). The stream data transmitting means 404 deletes, from the transmission data buffer 402, the data transmitted at Step S207 (Step S208).

A process for clipping each individual data and defining it as an analysis window corresponds to the preprocessing of analysis.

At the time series data reception/analysis step (Step S3), the time series data analyzing means 5 receives the data (analysis window) transmitted by the stream data transmitting means 404 (Step S301). The time series data analyzing means 5 is equipped with an analysis buffer (not shown) and temporarily stores the data transmitted by the stream data transmitting means 404 in the analysis buffer. The time series data analyzing means 5 analyzes the data stored in the analysis buffer in asynchronization with the data receiving timing (Step S302). Therefore, Steps S2 and S3 can also be carried out asynchronously. Specifically, it is possible to perform a data analysis in asynchronization with the operation of transmitting the analysis window by the stream data transmitting means 404. The time series data analyzing means 5 deletes the data that has been completed to be analyzed at Step S302, from the buffer of the time series data analyzing means 5 (Step S303).

Figure 13:
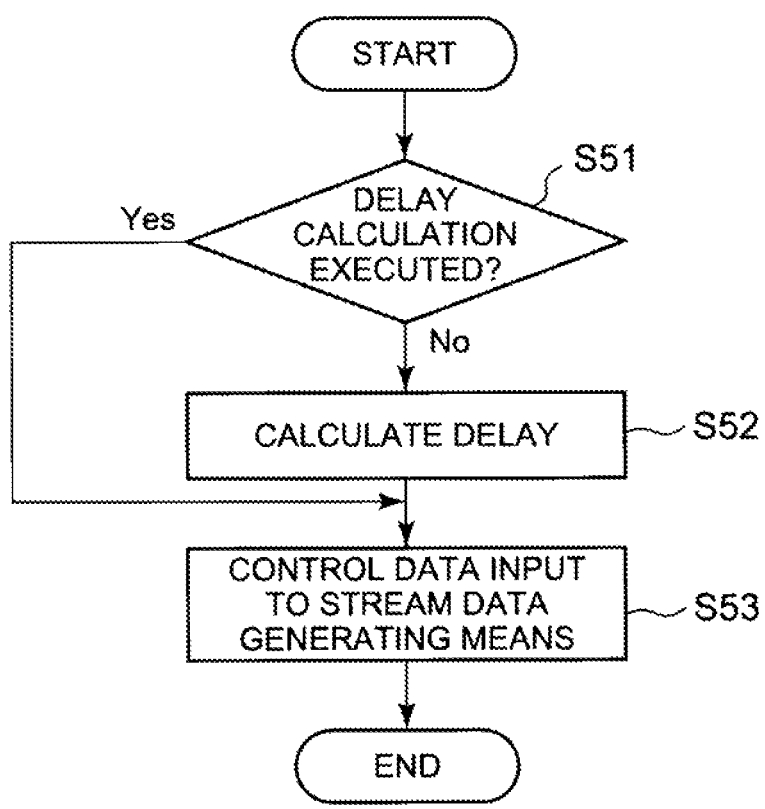
FIG. 13 It depicts a flowchart illustrating an example of the processing progress of rearrangement control.

A description will be made of the above Step S203 (rearrangement control processing). FIG. 13 is a flowchart showing an example of the processing progress of rearrangement control. In the example shown in FIG. 13, the delay calculating means 40502 first determines whether the delay calculation of each time series data generation source 1 has already been executed (Step S51). If the delay calculation of each time series data generation source 1 has not yet been executed (No at Step S51), the delay calculating means 40502 reads the data from the temporary buffer 40501 one by one for each ID of time series data generation sources, for example. The delay calculating means 40502 subtracts the date and time (date and time of generation) from the reception time included in each read data to thereby calculate the delay of each time series data generation source 1, and stores the calculated delay in correspondence with ID (e.g., vehicle ID) of the generation source of that data in the delay storing means 40503 (Step S52). After Step S52, the process proceeds to Step S53. In contrast, if the delay calculation of each time series data generation source 1 has already been executed (Yes at Step S51), the process proceeds to Step S53.

Incidentally, if the data generated by the respective time series data generation sources 1 are not collected in the temporary buffer 40501 in the case where the process proceeds to Step S52, the delay calculating means 40502 desirably awaits until the data generated by the time series data generation sources 1 are gathered, and carries out the process of Step S52 after the data of the time series data generation sources 1 have been gathered in the temporary buffer 40501. For example, the enough time that the pieces of data of all the time series data generation sources 1 are estimated to be gathered, is determined or fixed, and Step S52 may be executed after the determined time has elapsed. If the delay of each time series data generation source 1 can be calculated, Step S52 may be carried out at another timing. The delays of the individual time series data generation sources 1 may be calculated at discrete timings without calculating their delays in a lump.

The example shown in FIG. 13 shows an example in which Step S52 is first executed once, but Step S52 may be carried out regularly. That is, a process for subtracting the date and time (date and time of generation) from the reception time for each ID of time series data generation sources to thereby calculate the delay, may be performed every predetermined period. When the delay is calculated regularly for each ID of time series data generation sources, the timings at which the delays are calculated for each ID of times series data generation sources may be shifted. Even if the delay of each time series data generation source changes with the elapse of time due to the calculation of each delay on a regular basis, the delay to be stored in the delay storing means 40503 can be updated according to the change. When the delay of each time series data generation source changes, the delay maximum data generation source might be switched. Even in such a case, however, the transfer timing control means 40504 is capable of recognizing the delay maximum data generation source.

Figure 14:
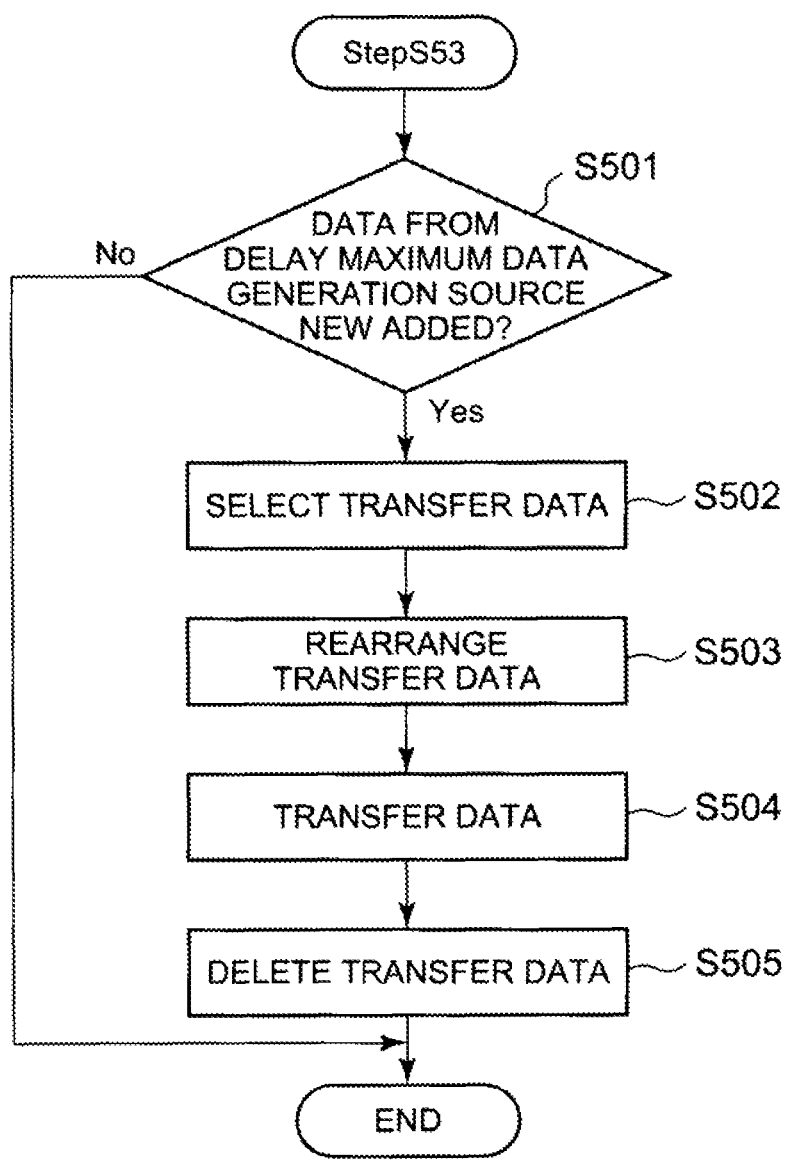
FIG. 14 It depicts a flowchart showing an example of the processing progress of Step S53.

At Step S53, the delay control means 405 performs control for returning the data stored in the temporary buffer 40501 to the stream data generating means 401 (Step S53). Step S53 is a process for substantially performing rearrangement. An example of the processing progress of Step S53 is shown in FIG. 14. When the process proceeds to Step S53, the transfer timing control means 40504 refers to each data stored in the temporary buffer 40501 and determines whether data generated by the delay maximum data generation source is newly added to the temporary buffer 40501 (Step S501). When the data generated by the delay maximum data generation source is not newly added to the temporary buffer 40501 (No at Step S501), the process of Step S53 is terminated without performing the process for rearranging the data and returning the same to the stream data generating means 401.

When the data generated by the delay maximum data generation source is newly added to the temporary buffer 40501 (Yes at Step S501), the transfer timing control means 40504 determines that the timing at which the data is rearranged and returned to the stream data generating means 401 has been reached, and instructs the data transfer means 40505 to input data to the stream data generating means 401. Then, the data transfer means 40505 confirms the date and time of generation of the data generated by the delay maximum data generation source and newly added to the temporary buffer 40501 and selects each data generated prior to the date and time of generation thereof out of the data stored in the temporary buffer 40501 (Step S502). That is, the data transfer means 40505 selects the data including the time of generation preceding the date and time of the data generated by the delay maximum data generation source.

Next, the data transfer means 40505 rearranges the selected data in order of time of generation thereof (Step S503) and inputs the rearranged data to the stream data generating means 401 (Step S504). Subsequently, the data transfer means 40505 deletes the data input to the stream data generating means 401 at Step S504, from the temporary buffer 40501 (Step S505).

The stream data generating means 401 stores the data input at Step S504 in order of time of generation thereof at Step S204 (refer to FIG. 12) in the transmission data buffer 402.

A concrete example is shown below in which when the data generated by the delay maximum data generation source is added to the temporary buffer 40501, the delay control means 405 (refer to FIG. 11) rearranges data generated prior to the added data and inputs the same to the stream data generating means 401. The example shown below illustrates the case where data generated by three time series data generation sources A through C are rearranged in time series order. In FIGS. 15 through 18 shown below, for ease of explanation, the time is represented by values of 1, 2, 3, . . . , and the respective data are expressed in numbers with parentheses, like (1), (2), (3), etc. in order of time of generation thereof.

FIG. 15 is an example of a time table indicative of when any data is generated by any time series data generation source. Numbers with parentheses illustrated in rows of respective times indicate data generated at the times. For example, the time 1 shows that the time series data generation source C has generated data (1). Likewise, the time 2 indicates that the time series data generation source B has generated data (2). The time 3 indicates that the time series data generation source C has generated data (3). Other times are also similar to the above.

FIG. 16 is a time table showing timings at which the data receiving means 3 receives data therein and the data are input to the stream data generating means 401. The present example shows, as an example, the case where, for ease of explanation, the interval from the reception of the data by the data receiving means 3 to the input of the data to the stream data generating means 401 is short and the data reception timing and the data input timing are assumed to be substantially simultaneous. FIG. 16 shows that, for example, the data (1) generated by the time series data generation source C is stored in the temporary buffer 40501 at the time 3, and the data (3) generated by the time series data generation source C and the data (4) generated by the time series data generation source A are stored in the temporary buffer 40501 at the time 5. FIG. 16 also shows that, for example, the data (2) generated by the time series data generation source B is stored in the temporary buffer 40501 at the time 6.

In the present example, the delays of the time series data generation sources A, B and C are 1, 4 and 2 respectively.

Thus, for example, the data (4) generated by the time series data generation source A at the time 4 is stored in the temporary buffer at the time 5 obtained by adding the delay 1 to the time 4. Also the data (2) generated by the time series data generation source B at the time 2 is stored in the temporary buffer at the time 6 obtained by adding the delay 4 to the time 2. The data (1) generated by the time series data generation source C at the time 1 is stored in the temporary buffer at the time 3 obtained by adding the delay 2 to the time 1 (refer to FIGS. 15 and 16 as above). In the present example, the time series data generation source B corresponds to the delay maximum data generation source because the delay 4 of the time series data generation source B is maximum.

Thus, when the data (2) generated by the time series data generation source B is added to the temporary buffer at the time 6, the transfer timing control means 40504 instructs the data transfer means 40505 to input data to the stream data generating means 401 at that time. The data transfer means 40505 selects the data (1) and (2) generated prior to the data (2), arranges the data in order of time of generation thereof and inputs the same to the stream data generating means 401. Subsequently, the data transfer means 40505 deletes the data (1) and (2) from the temporary buffer. FIG. 17 is a time table from which the data (1) and (2) input to the stream data generating means 401 are deleted.

When the data (5) generated by the time series data generation source B is added to the temporary buffer at the time 9, the transfer timing control means 40504 instructs the data transfer means 40505 to input data to the stream data generating means 401 at that time. The data transfer means 40505 selects the data (3) through (5) generated prior to the data (5), from the data stored in the temporary buffer, arranges the data in order of time of generation thereof and inputs the same to the stream data generating means 401. Subsequently, the data transfer means 40505 deletes the data (3) through (5) from the temporary buffer. FIG. 18 is a time table from which the data (3) through (5) input to the stream data generating means 401 are deleted. Subsequent operations are also similar.

According to the present embodiment, as described above, when the data generated by the delay maximum data generation source is added to and stored in the temporary buffer, the data transfer means 40505 selects the data generated prior to the added data, from the temporary buffer and rearranges the data in order of time of generation thereof. The rearranged data are stored in the transmission data buffer 402, and the analysis window can be generated from the data. It is thus possible to transmit the data generated by the respective time series data generation means to the time series data analyzing means 5 at high speed and in time series order.

When the buffering time at the temporary buffer 40501 is rendered short without waiting for the timing at which the data generated by the delay maximum data generation source is added to and stored in the temporary buffer, the data transfer means 40505 transmits the data to the stream data generating means 401, followed by arrival of the data generated prior to the transmitted data at the temporary buffer 40501, whereby the order of data is disordered. Excessively prolonging the buffering time at the temporary buffer increases a time interval from the generation of data to the analysis of the data by the time series data analyzing means 5, thus leading to impairment of real-time performance for analysis. According to the present embodiment, it is possible to prevent such disorder of data order and a reduction in the real-time performance.

In addition, according to the present embodiment, when the data receiving means 3 receives the data generated by each time series data generation source 1, the stream data generating means 401 stores the data without storing the data therein as the database or file in the memory (transmission data buffer 402). In the case of access to the database and the file in SQL, the processing takes time. In the invention of the present application, however, the data can be quickly transmitted to the time series data analyzing means 5 because the data are stored in the memory.

Embodiment 2

An analysis preprocessing system of a second embodiment of the present invention is also equipped with data receiving means 3 and data stream generating means 4 in a manner similar to the first embodiment (refer to FIG. 1). When receiving data generated by time series data generation sources 1 from data transmitting means 2, the analysis preprocessing system performs preprocessing of the data and transmits the so-preprocessed data to time series data analyzing means 5.

Figure 19:
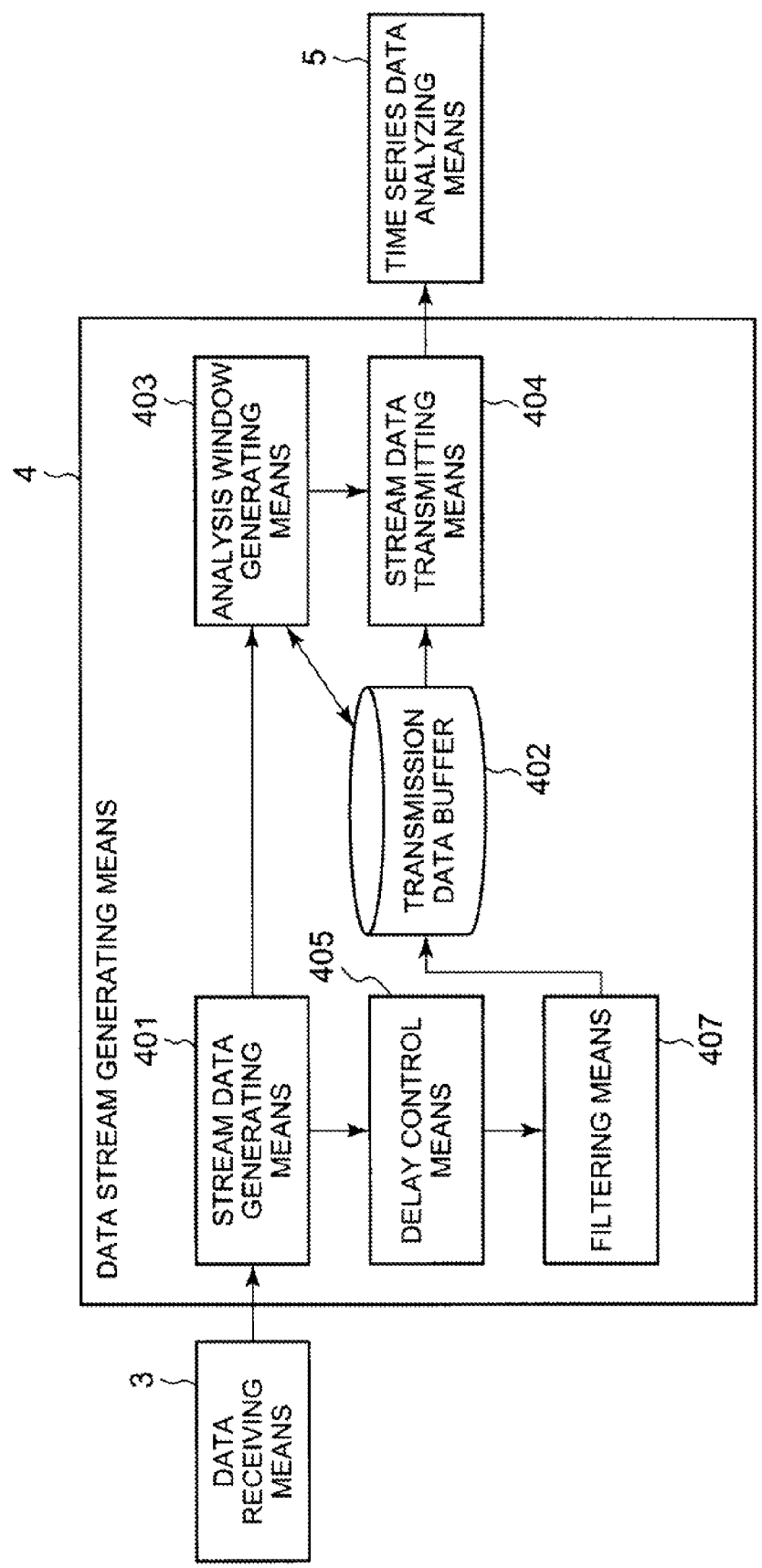
FIG. 19 It depicts a block diagram showing a configuration example of data stream generating means in a second embodiment.

FIG. 19 is an explanatory diagram showing a configuration example of the data stream generating means 4 in the second embodiment. The data stream generating means 4 in the present embodiment is equipped with filtering means 407 in addition to stream data generating means 401, delay control means 405, transmission data buffer 402, analysis window generating means 403 and stream data transmitting means 404. The stream data generating means 401, the delay control means 405, the transmission data buffer 402, the analysis window generating means 403 and the stream data transmitting means 404 are similar to those of the first embodiment.

In the present embodiment, however, when the delay control means 405 detects new data generated by a delay maximum data generation source and rearranges data preceding the detected data, the delay control means 405 inputs the data to the filtering means 407.

The filtering means 407 performs filtering processing on the individual data rearranged in order of time of generation thereof by the delay control means 405. In other words, the filtering means 407 determines, for each data, whether each data rearranged in order of time of generation thereof satisfies a predetermined condition. The filtering means 407 stores the data satisfying the predetermined condition in the transmission data buffer 402, and cancels the data unsatisfying the predetermined condition. This predetermined condition is a condition indicating that each data is useful for analysis. Incidentally, in the present embodiment, the deletion of the reception time added to each data as illustrated by the example in FIG. 9 is performed by the filtering means 407, for example. The filtering means 407 may however store each data as it is without deleting the reception time thereof in the transmission data buffer 402.

As an example of the predetermined condition, for instance, the condition that "contents of any data already stored in the transmission buffer 402 differ from each other" may be used. Assume that data having the same contents as that of the data already stored in the transmission data buffer 402 is stored in the transmission data buffer 402. In this case, the stream data transmitting means 404 transmits a plurality of pieces of data having the same contents to the time series data analyzing means 5. The time series data analyzing means 5 may, however, not require the plurality of pieces of data having the same contents upon the analysis.

Assume that for example, sensors (the time series data generation sources 1) provided in individual probe cars generate data (refer to FIG. 4) including the positions of the probe cars, their speed and vehicle ID at predetermined time intervals, and the time series data analyzing means 5 performs analyses about the data. In this case, the stopped probe cars repeatedly generate the data having the same positions of the probe cars, their speed and vehicle ID. In contrast, there is a case in which when the situations (positions and speed) of a given probe car change, the analysis processing of the time series data analyzing means 5 needs their changed contents and needs not to refer to data having unchanged contents. In such a case, the pieces of data having the same positions, speed and vehicle ID are redundant data and not used for analysis. To give a concrete example, when the average speed of each vehicle is determined upon analysis, the data about the stopped vehicles are not necessary for calculation of the average speed, and such pieces of data are not required to be sent to the time series data analyzing means 5 in plural form.

The filtering means 407 stores the data that satisfies the condition that "contents of any data already stored in the transmission buffer 402 differ from each other" in the transmission data buffer 402, and cancels the data (i.e., data having the same contents as that of the data already stored in the transmission data buffer 402) that does not satisfy the condition. As a result, it is possible to prevent the redundant data from being transmitted to the time series analyzing means 5.

A description will hereinafter be made of, as an example, the case where the condition that "contents of any data already stored in the transmission buffer 402 differ from each other" is used as a predetermined condition. This condition is described as a first condition. The first condition is one example of a predetermined condition indicating that the data is useful for analysis. As will be described later, other conditions may be used.

Figure 20:
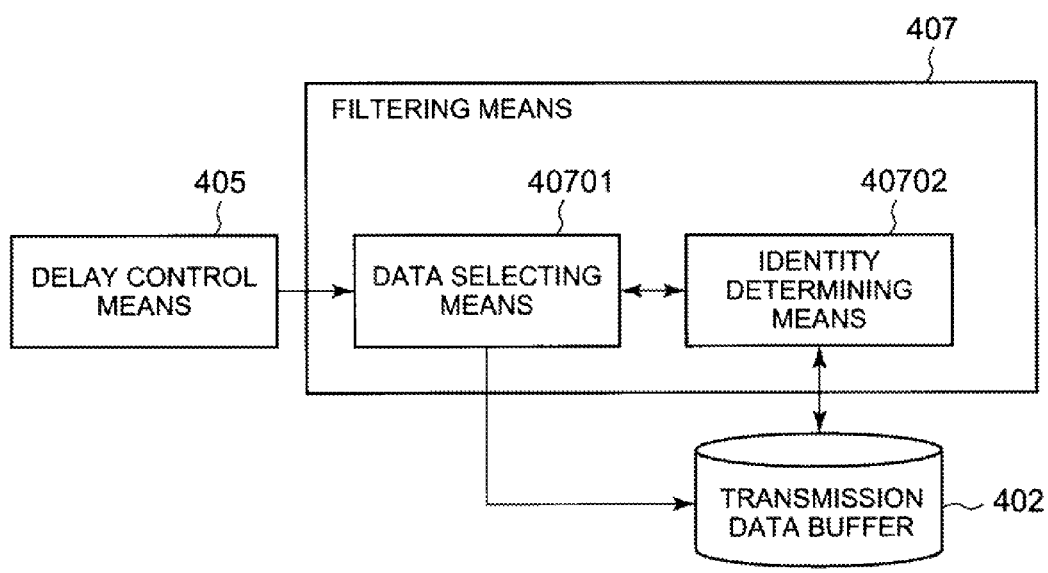
FIG. 20 It depicts a block diagram illustrating a configuration example of filtering means.

FIG. 20 is a block diagram showing a configuration example of the filtering means 407. The filtering means 407 is equipped with data selecting means 40701 and identity determining means 40702.

The identity determining means 40702 determines whether the respective data input from the delay control means 405 and the respective data already stored in the transmission data buffer 402 are identical in contents therebetween. The individual data input from the delay control means 405 are data to be targeted for determination of filtering, which will be described below as filtering determination target data.

In the present example, assume that it is essential that the time series data generation sources 1 are identical to make the contents of the data identical. It is essential that the vehicle IDs are identical in the case of the data about the probe cars illustrated by the example in FIG. 4, for example. Data different in vehicle ID are not data having the same contents even if they are coincident in latitude, longitude and speed. When the identity of the time series data generation sources 1 is taken as an essential condition for data identity, the date and time differ between respective data generated with the elapse of time. Thus, when it is determined whether the data are identical in contents, whether the data are identical in date and time may be ignored. As in the date and time, items that may be ignored whether they are identical may exist in items contained in the data.

Items (e.g., latitude, longitude and speed illustrated in FIG. 4 by way of example) that include errors in data need not to perfectly coincide with each other. In this case, the identity determining means 40702 may calculate a difference between each value included in the data stored in the transmission data buffer 402 and each value included in the filtering determination target data, and determine whether the difference falls within a predetermined range. As to the speed, for example, a difference between the speed in the data stored in the transmission data buffer 402 and the speed in the filtering determination target data is calculated. If the difference is within a range from −5 to +5, it is determined that the speed is identical. The units of −5 and +5 shown in the present example are "km/h". Even as to the latitude and longitude, it is determined whether the difference between values of the data falls within a predetermined range. If the difference falls within the range, they may be determined to be the same contents.

Thus, when the identity determining means 40702 determines that, between the filtering determination target data and the data stored in the transmission data buffer 402, IDs (e.g., vehicle ID) of the time series data generation sources 1 coincide with each other and the contents of other items (e.g., latitude, longitude and speed) are also the same, the identity determining means 40702 may determine that the data are of the same contents. When ID of the time series data generation sources 1 do not coincide with each other or the items determined not to be the same contents exist in any other item (e.g., any of latitude, longitude and speed), the identity determining means 40702 may determine the data not to be of the same contents.

The data selecting means 40701 confirms whether the contents of the filtering determination target data are determined not to be the same as those of any data in the transmission data buffer 402 for each filtering determination target data. Then, the data selecting means 40701 stores the filtering determination target data in the transmission data buffer 402 or cancels the same according to the result of confirmation.

When the contents of the filtering determination target data are determined not to be the same as those of any data in the transmission data buffer 402, the data to be filtered satisfies the above first condition. In this case, the data selecting means 40701 stores the filtering determination target data in the transmission data buffer 402.

In contrast, when the contents of the filtering determination target data are determined to be the same as those of any data in the transmission data buffer 402, the filtering determination target data is assumed not to satisfy the above first condition. In this case, the data selecting means 40701 cancels the filtering determination target data.

The filtering means 407 (the data selecting means 40701 and identity determining means 40702) is achieved by, for example, a CPU of a computer operating in accordance with an analysis preprocessing program. In this case, the CPU may operate as the filtering means 407 (the data selecting means 40701 and identity determining means 40702) and other respective means in accordance with the analysis preprocessing program. The data selecting means 40701 and the identity determining means 40702 may be achieved by discrete dedicated circuits respectively.

Figure 21:
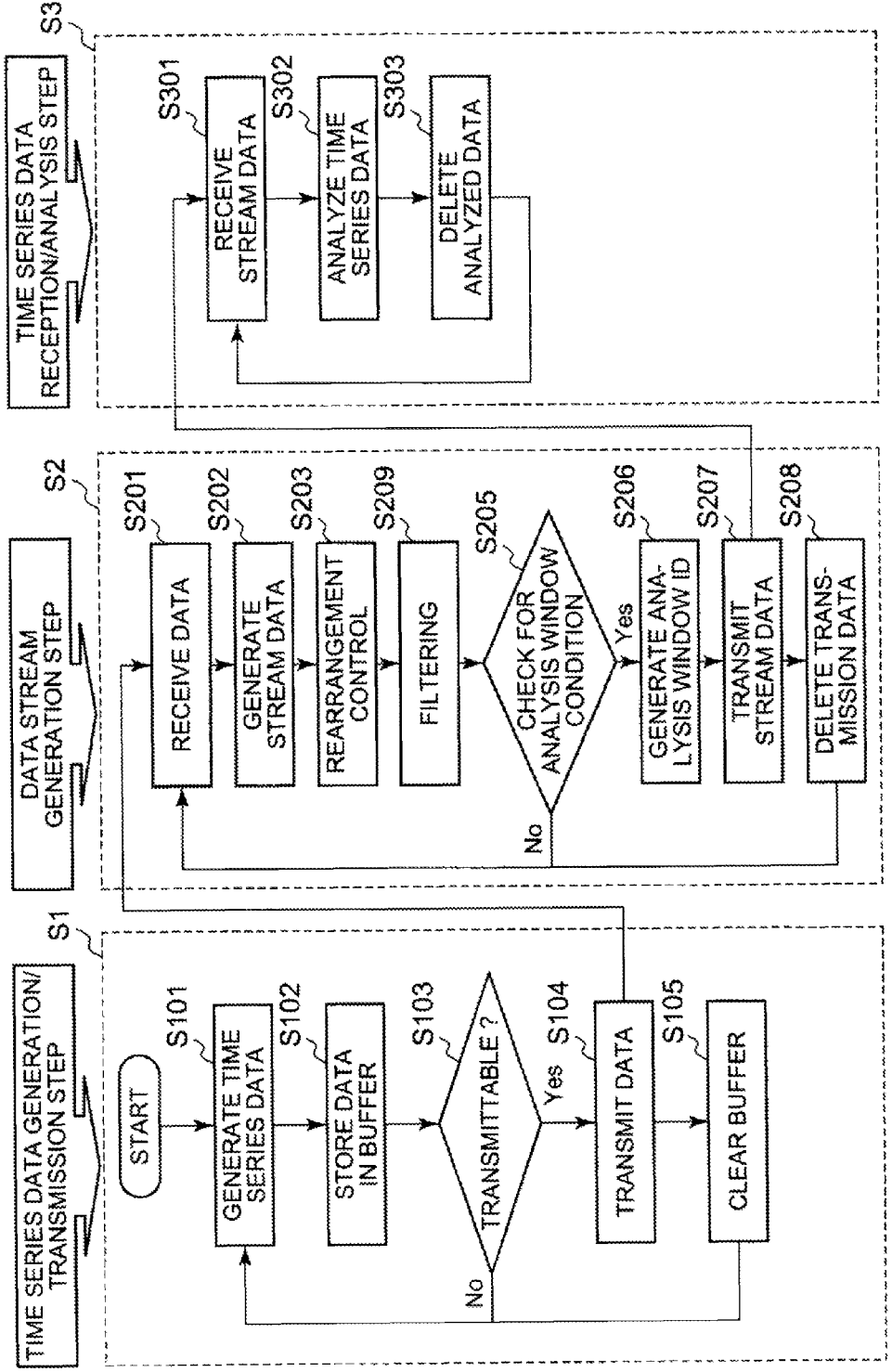
FIG. 21 It depicts an explanatory diagram showing an example of the processing progress of the second embodiment.

FIG. 21 is an explanatory diagram showing an example of the processing progress of the second embodiment. The same reference numerals as those in FIG. 12 are respectively attached to the processes similar to those of the first embodiment, and their description is omitted. A time series data generation/transmission step (Step S1) and a time series data reception/analysis step (Step S3) are similar to those of the first embodiment.

As to a data stream generation step (Step S2), when the delay control means 405 rearranges the data at Step S203, the filtering means 407 performs filtering processing (Step S209) on each data rearranged, and stores the individual data in the transmission data buffer 402 or cancels the data. Other respects are similar to those of the first embodiment.

Figure 22:
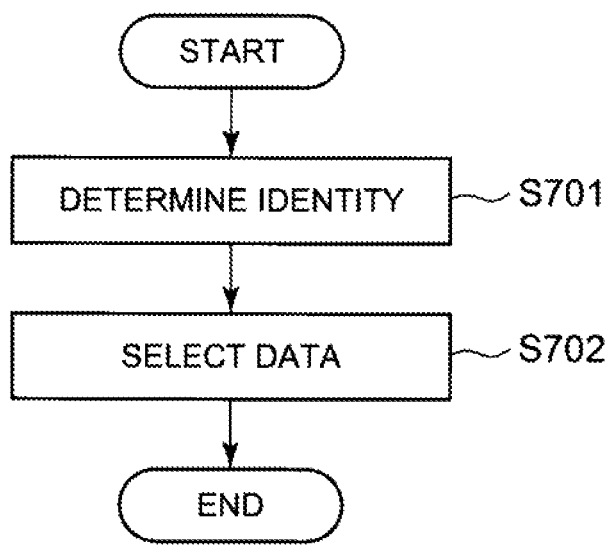
FIG. 22 It depicts a flowchart showing an example of the processing progress of filtering processing.

FIG. 22 is a flowchart showing an example of the processing progress of the filtering processing (Step S209). When the delay control means 405 rearranges data preceding new data detected from the delay maximum data generation source upon detection thereof (Step S203, refer to FIG. 21), the delay control means 405 inputs the data to the filtering means 407. Each individual data is filtering determination target data.

When the filtering determination target data is input, the identity determining means 40702 determines, for each filtering determination target data, whether the filtering determination target data has the same contents as those of the individual data stored in the transmission data buffer 402 (Step S701).

The data selecting means 40701 stores the filtering determination target data in the transmission data buffer 402, and the target data is determined not to have the same contents as those of any data in the transmission data buffer 402 (Step S702). Incidentally, at this time, the data selecting means 40701 deletes the reception time (refer to FIG. 9) added to each filtering determination target data and stores the filtering determination target data in the transmission data buffer 402. Also the data selecting means 40701 cancels the filtering determination target data that is determined to have the same contents as those of any data in the transmission data buffer 402 (Step S702). By executing the process of Step S702, data is selected.

When the data selecting means 40701 stores the data in the transmission data buffer 402 at Step S702, the data selecting means 40701 notifies the analysis window generating means 403 of a pointer to each memory area with the data stored therein. The data selecting means 40701 may perform this notification via the stream data generating means 401.

According to the present embodiment, an effect similar to that of the first embodiment is obtained. Further, in the present embodiment, since the filtering means 407 cancels the redundant data unused for analysis, the redundant data can be prevented from being stored in the transmission data buffer 402.

The above second embodiment has explained the case where the condition (first condition) that "any data already stored in the transmission buffer 402 differs in contents" is used as a predetermined condition used in the filtering processing. A description will be made of the case in which another condition is used, as a modification of the second embodiment. In the modification of the second embodiment, the operation of the filtering means 407 differs but other respective means are similar to those of the second embodiment.

In the present modification, the condition that "the contents of data satisfy a predetermined reference" is used as a predetermined condition used in filtering processing. This condition is described as a second condition. For example, errors might be contained in the contents included in the data. Even in the case of the data containing the errors, however, the data can effectively be used for analysis if the data satisfies the reference. The reference for discriminating the effective data usable in analysis in this way is determined in advance. The filtering means 407 determines whether the contents of the filtering determination target data satisfy this reference and cancels the data that does not satisfy the reference.

A description will be made of, as an example, data generated by sensors (time series data generation sources 1) provided in individual probe cars. Each data often contains a position, speed, a direction and so on. These values however contain errors. In particular, the position (e.g., latitude, longitude) is generally acquired by a GPS (Global Positioning System). A large error may be included upon calculation of the position due to the effect of buildings or the like. Since the data containing such a large error cannot be used for analysis, the filtering means 407 eliminate it.

Figure 23:
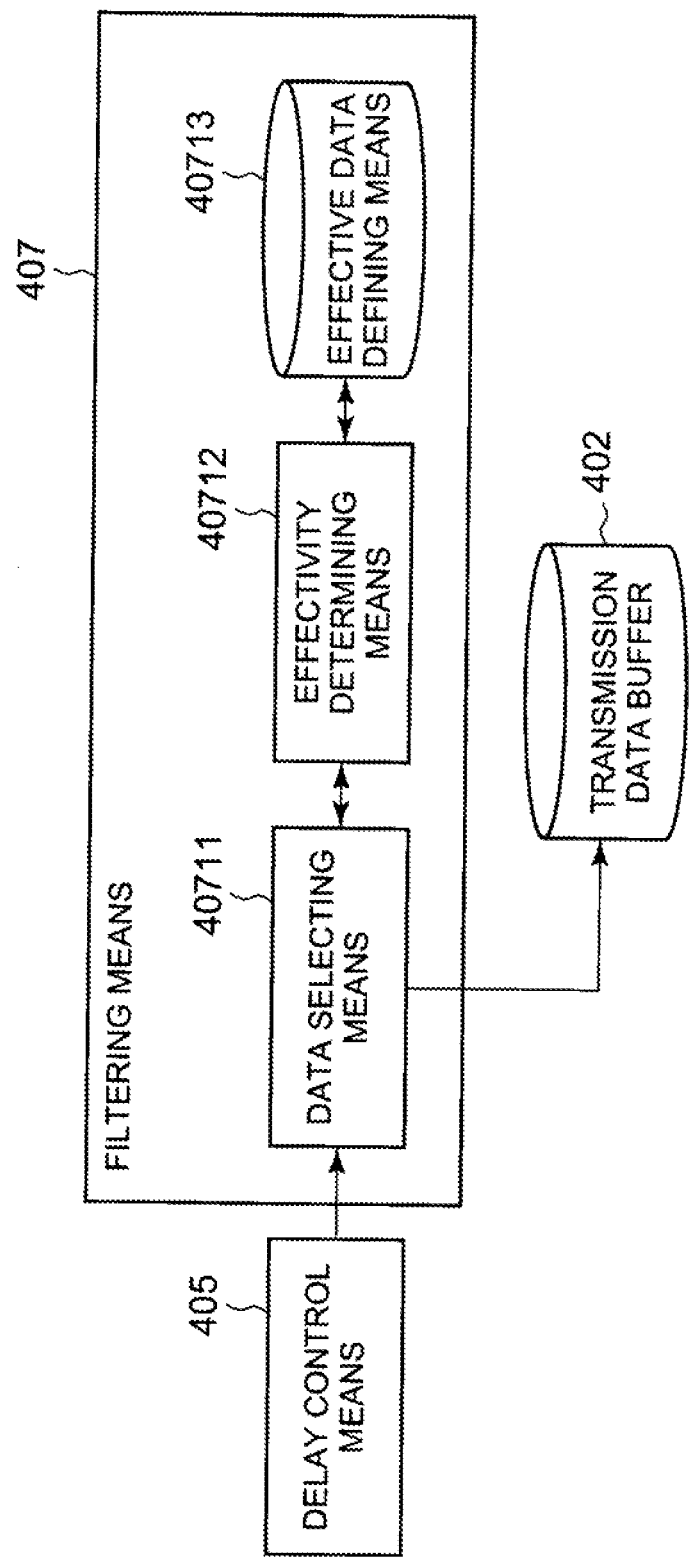
FIG. 23 It depicts a block diagram illustrating a configuration example of filtering means in a modification of the second embodiment.

FIG. 23 is a block diagram showing a configuration example of the filtering means 407 in the present modification. The filtering means 407 in the present modification is equipped with effective data defining means 40713, effectivity determining means 40712 and data selecting means 40711.

The effective data defining means 40713 is a storage device that stores a reference for the contents of data usable effectively. FIG. 24 is an explanatory diagram showing an example of the reference stored in the effective data defining means 40713. The reference illustrated by an example in FIG. 24 corresponds to the data illustrated by the example in FIG. 4 and shows a reference that the date and time, vehicle ID, latitude, longitude and speed should satisfy. The "minimum" and "maximum" shown in FIG. 4 define a range for the values of these items. If the values of the items contained in the data are included in the range from the "minimum" to "maximum", the values of the items are effective. In the example shown in FIG. 24, for example, the date and time are effective if included in a range from "one day ago from the present time" to "the present time". Likewise, the vehicle ID is effective if included in a range from "CID0001" to "CID9999". Thus, when the values of the items are combinations of a character string and numeric values, the range of their numeric values may be defined. The latitude is effective if included in a range from 34.000 to 36.000. The longitude is effective if included in a range from 134.000 to 136.000. The speed is effective if included in a range from 0 to 120. Although the "minimum" and "maximum" are defined in the present example, only either of them may be defined.

A "difference" shown in FIG. 24 is a reference that prescribes or defines a relation with immediately preceding data (immediately preceding data identical in time series data generation source). In the example shown in FIG. 24, for example, the date and time are effective if a difference in date and time with respect to immediately preceding data identical in vehicle ID is within one hour. As to the vehicle ID, the "difference" is not defined. The latitude is effective if a difference in latitude with respect to the immediately preceding data identical in vehicle ID is 0.01 or less. The longitude is effective if a difference in longitude with respect to the immediately preceding data identical in vehicle ID is 0.01 or less. The speed is effective if a difference in speed with respect to the immediately preceding data identical in vehicle ID is 120 or less.

The reference that each of the "minimum" and "maximum" defines is an absolute reference that each item included in the data should satisfy. The "difference" is a relative reference that each item included in the data should satisfy in a relationship with other data. Although the absolute reference (minimum, maximum) and the relative reference (difference) are defined in the example shown in FIG. 24, only either of them may be determined.

When filtering determination target data is input from the delay control means 405, the effectivity determining means 40712 determines whether each item in the filtering determination target data satisfies each reference stored in the effective data defining means 40713. For example, assume that the reference illustrated by the example in FIG. 24 is being stored. The effectivity determining means 40712 determines whether the date and time, vehicle ID, latitude, longitude and speed in the filtering determination target data each are included in range from the minimum value to the maximum value. The effectivity determining means 40712 calculates a difference between each of the date and time, latitude, longitude and speed and a value at immediately preceding filtering determination target data, and determines whether the result of calculation satisfies the reference prescribed as the "difference".

If the effectivity determining means 40712 has determined effectivity about given filtering determination target data to determine the relative reference, the effectivity determining means 40712 stores the filtering determination target data therein until the next filtering determination target data generated by the same time series data generation source is input. Alternatively, the effectivity determining means 40712 may determine the relative reference by referring to the immediately preceding data stored in the transmission data buffer 402.

The data selecting means 40711 confirms the result of determination by the effectivity determining means 40712 for each filtering determination target data. The data selecting means 40711 stores the filtering determination target data in the transmission data buffer 402 or cancels the same according to the result of confirmation.

When it is determined that each item in the filtering determination target data has satisfied the reference defined in the effective data defining means 40713, the filtering target data is determined to satisfy the second condition described above. In this case, the data selecting means 40711 stores the filtering determination target data in the transmission data buffer 402.

In contrast, when each item in the filtering determination target data is determined not to satisfy the reference defined in the effective data defining means 40713, the filtering target data is determined not to satisfy the second condition described above. In this case, the data selecting means 40711 cancels the filtering determination target data. If any item is determined not to satisfy the absolute reference or the relative reference, for example, the data selecting means 40711 cancels the filtering determination target data.

The data selecting means 40711 and the effectivity determining means 40712 of the filtering means 470 in the present modification are achieved by, for example, a CPU of a computer operating in accordance with an analysis preprocessing program. In this case, the CPU may operate as the data selecting, means 40711 and the effectivity determining means 40712, and other respective means in accordance with the analysis preprocessing program. The data selecting means 40711 and the identity determining means 40712 may be achieved by discrete dedicated circuits respectively.

Figure 25:
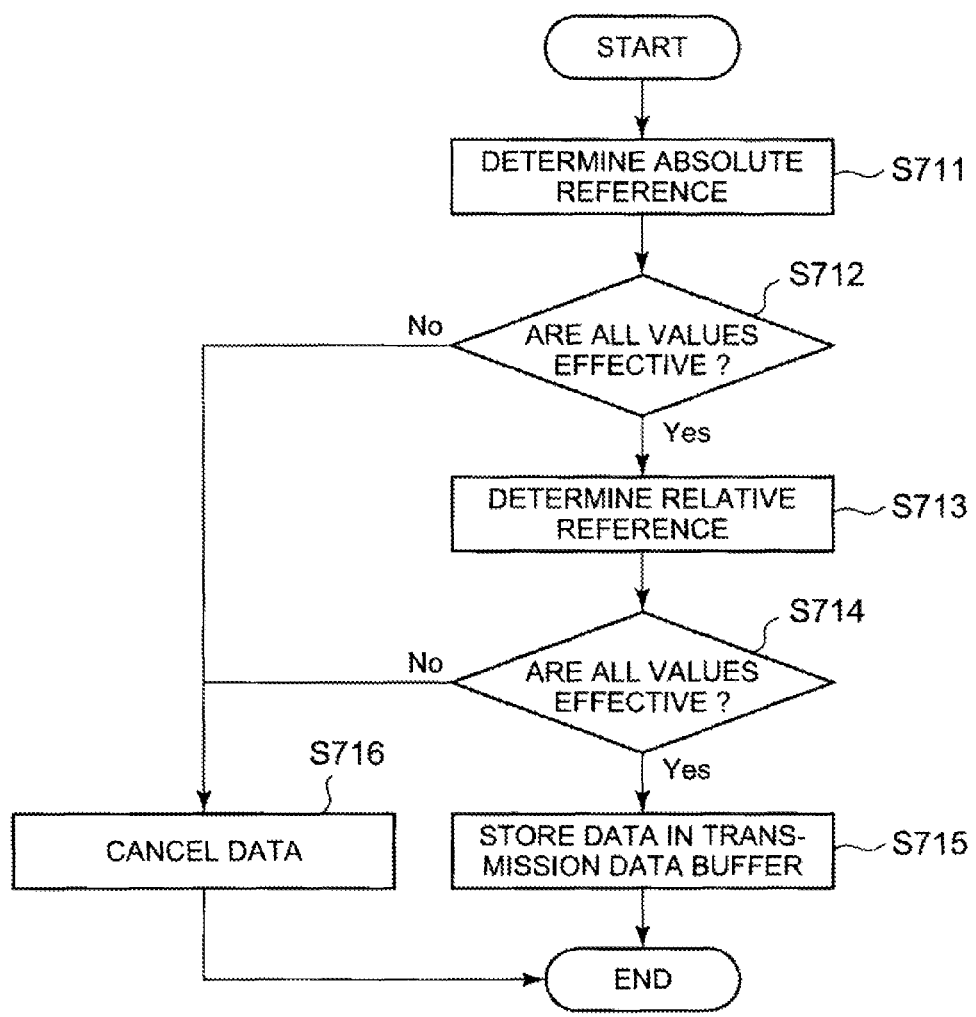
FIG. 25 It depicts a flowchart illustrating an example of the processing progress of filtering processing in the modification of the second embodiment.

The processing progress of the present modification is similar to that of the second embodiment (refer to FIG. 21). Processing in the filtering processing (Step S209) however differs. FIG. 25 is a flowchart showing an example of the processing progress of the filtering processing in the present modification. When filtering determination target data is input from the delay control means 405, the effectivity determining means 40712 determines whether each item in the filtering determination target data satisfies the absolute reference (Step S711). When the reference illustrated by the example in FIG. 24 is defined, for example, it is determined whether the date and time, vehicle ID, latitude, longitude and speed are included in the range from the minimum value to the maximum value. When it is determined that all items satisfy the absolute reference (Yes at Step S712), the effectivity determining means 40712 determines whether each item in the filtering determination target data satisfies the relative reference (Step S713). The effectivity determining means 40712 calculates a difference between each of the time, latitude, longitude and speed, for example and immediately filtering determination target data identical in vehicle ID and determines whether the difference satisfies the prescribed reference ("difference" illustrated by the example in FIG. 24).

The data selecting means 40711 confirms the result of determination regarding the absolute reference and the result of determination as to the relative reference. When it is determined that any item has not satisfied the reference at the determination as to the absolute reference (Step S711) or the determination as to the relative reference (Step S713) (No at Step S712 or No at Step S714), the data selecting means 40711 cancels its filtering determination target data (Step S716). When it is determined that each item has satisfied the reference at the determination as to the absolute reference (Step S711) and the determination as to the relative reference (Step S713) (Yes at Step S714), the data selecting means 40711 deletes the reception time (refer to FIG. 9) from filtering determination target data and stores the filtering determination target data in the transmission data buffer 402 (Step S715). When the data selecting means 40711 has stored the data in the transmission data buffer 402 at Step S715, the data selecting means 40711 notifies the analysis window generating means 403 of a point to a memory area with the data stored therein. The data selecting means 40711 may performs this notification via the stream data generating means 401.

Operations subsequent to Step S205 (refer to FIG. 21) after the filtering processing are similar to those of the second embodiment. According to the present modification, it is possible to transmit information useful for analysis to the time series data analyzing means 5 except for the data non-useful for analysis.

A modification in which the condition that "there is no duplication of any data already input from the delay control means 405" is used in filtering processing, will next be shown as another modification of the second embodiment. This condition is described as a third condition.

Figure 26:
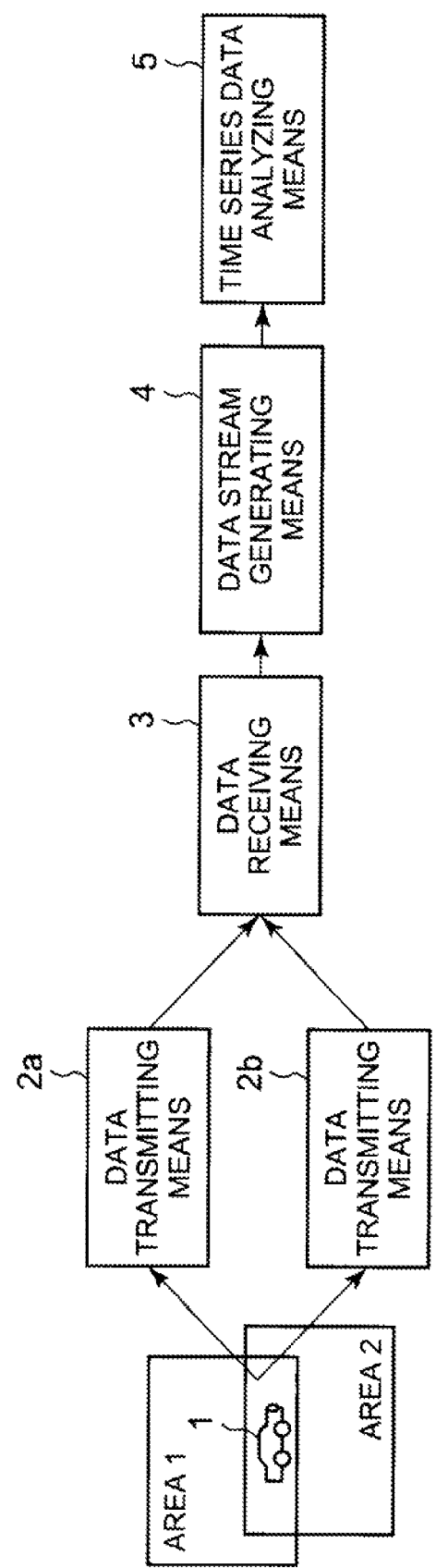
FIG. 26 It depicts an explanatory diagram showing a concrete example of a situation in which the duplication of data occurs.

In the process from the generation of data by each time series data generation source 1 to the reception of the data by the data receiving means 3, the duplication of each time series data generation source 1 might occur and thereby the data receiving means 3 might receive the same data in plural form. For example, when a plurality of data transmitting means 2 receive the same data from the same time series data generation source 1 and transmit the data to the analysis preprocessing system, such a matter occurs. FIG. 26 is an explanatory diagram showing a concrete example of this situation. Assume that a time series data generation source 1 is a sensor provided in a probe car, and data transmitting means 2a and 2b are base stations each of which relays data between the time series data generation source 1 and its corresponding data receiving means 3. The base station is provided for each area but disposed such that the corresponding areas partially overlap with each other. When the probe car exists in a portion where the areas corresponding to the base stations overlap with each other, and data is sent by wireless from its position, the base stations 2a and 2b corresponding to the respective areas each receive the same data therein. Since the base stations 2a and 2b both transmit the received data to the analysis preprocessing system, the data receiving means 3 receives the same data in plural form. The so-duplicated data are unnecessary for the analysis in the time series data analyzing means 5, and the filtering means 407 eliminates the data.

Figure 27:
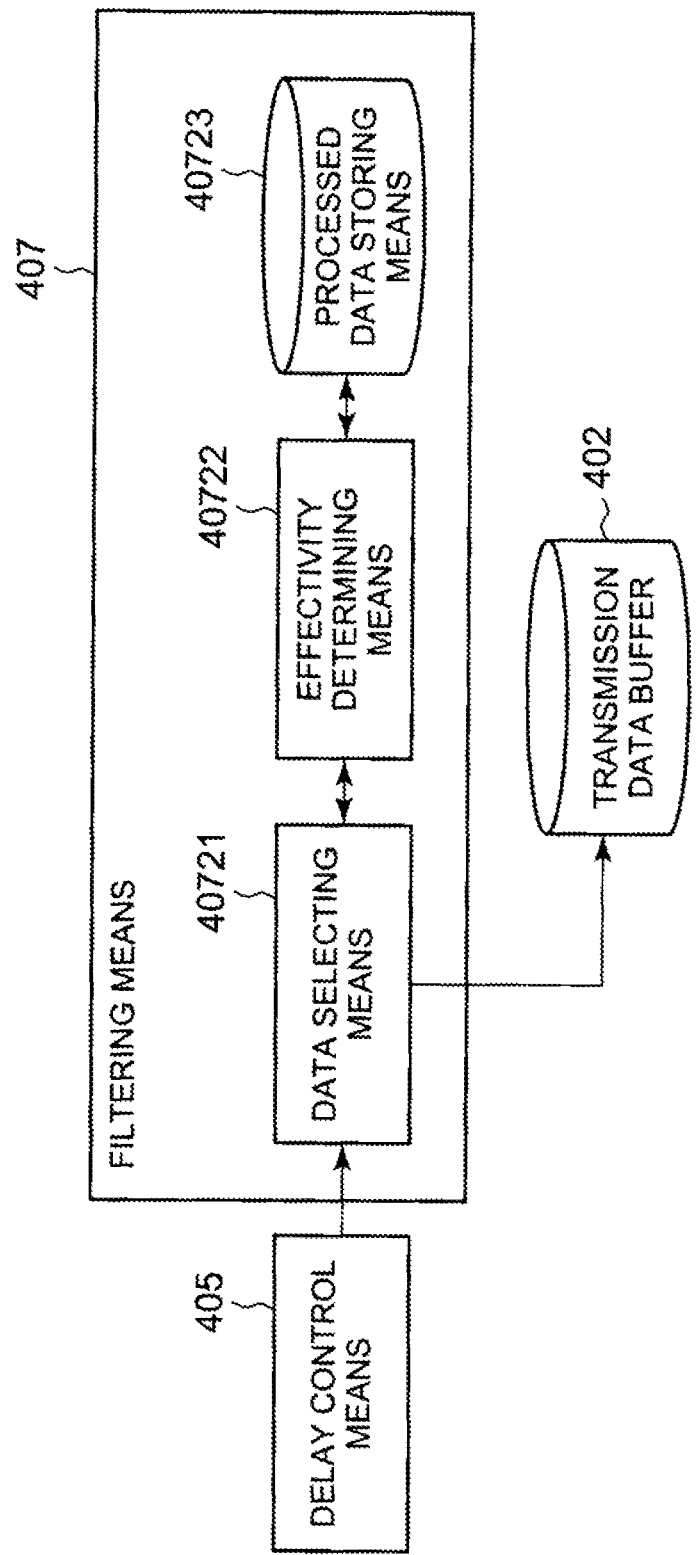
FIG. 27 It depicts a block diagram illustrating a configuration example of filtering means in another modification of the second embodiment.

FIG. 27 is a block diagram showing a configuration example of the filtering means 407 where the third condition is used. The filtering means 407 in the present modification is equipped with processed data storing means 40723, effectivity determining means 40722 and data selecting means 40721.

The processed data storing means 40723 is a storage device that stores data identification information for identifying the respective data input from the delay control means 405. FIG. 28 shows an example of the data identification information stored in the processed data storing means 40723. When two or more pieces of data exist which are identical in the generation source of data and the generation time thereof, data subsequent to the second data is duplicate. Thus, as shown in FIG. 28, a combination of the date and time and ID (e.g., vehicle ID) of each time series data generation source may be taken as the data identification information. A first record in FIG. 28 means that data generated on the date and time "2008/7/20 12:00:00" at a probe car "CID0001" has already been received.

When filtering determination target data is input from the delay control means 405, the effectivity determining means 40722 determines, by referring to the data identification information stored in the processed data storing means 40723, whether the filtering determination target data is data not yet input. If the filtering determination target data is determined to be data not yet input, the effectivity determining means 40722 stores data identification information (e.g., set of date and time and vehicle ID) of the filtering determination target data in the processed data storing means 40723.

The data selecting means 40721 confirms the result of determination by the effectivity determining means 40722 for each filtering determination target data. Then, the data selecting means 40721 stores the filtering determination target data in the transmission data buffer 402 or cancels the same according to the result of confirmation.

The determination of the filtering determination target data to be the not-yet input data means that the filtering determination target data has been input for the first time, thus resulting in satisfaction of the third condition. In this case, the data selecting means 40721 stores the filtering determination target data in the transmission data buffer 402.

In contrast, the third condition is not satisfied where it is determined that the filtering determination target data is the already-input data. In this case, the data selecting means 40721 cancels the filtering determination target data.

The data selecting means 40721 and the effectivity determining means 40722 of the filtering means 407 in the present modification are achieved by, for example, a CPU of a computer operating in accordance with an analysis preprocessing program. In this case, the CPU may operate as the data selecting means 40721 and the effectivity determining means 40722 or other respective means in accordance with the analysis preprocessing program. The data selecting means 40721 and the effectivity determining means 40722 may be achieved by discrete dedicated circuits respectively.

Figure 29:
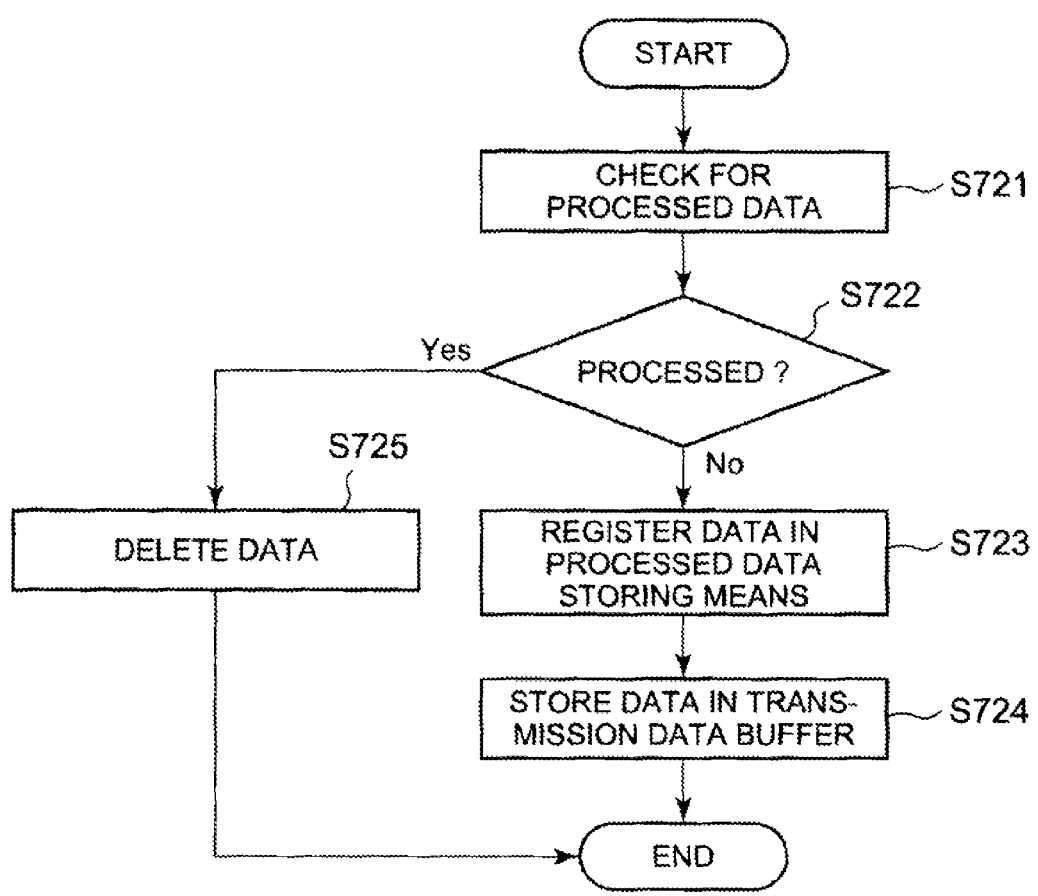
FIG. 29 It depicts a flowchart illustrating an example of the processing progress of filtering processing in another modification of the second embodiment.

The processing progress of the present modification is similar to that of the second embodiment (refer to FIG. 21). The processing in the filtering processing (Step S209) however differs. FIG. 29 is a flowchart showing an example of the processing progress of the filtering processing in the present modification.

When filtering determination target data is input from the delay control means 405, the effectivity determining means 40722 determines whether the filtering determination target data is not-yet input data (Step S721). Described specifically, the effectivity determining means 40722 determines whether data identification information (e.g., set of the date and time and vehicle ID) of the input filtering determination target data has already been stored in the processed data storing means 40723 (Step S722). If the data identification information has not been stored therein (No at Step S722), the filtering determination target data corresponds to the not-yet input data (firstly input data). In contrast, if the data identification information has been stored therein (Yes at Step S722), the filtering determination target data is already input.

If the filtering determination target data is the firstly input data (No at Step S722), the effectivity determining means 40722 additionally stores the data identification information of the filtering determination target data in the processed data storing means 40723 (Step S723).

The data selecting means 40721 confirms the result of determination by the effectivity determining means 40722. If the input filtering determination target data has already been input (Yes at Step S722), the data selecting means 40721 cancels the filtering determination target data (Step S725). If the input filtering determination target data is the firstly input data (No at Step S722), the data selecting means 40721 deletes the reception time (refer to FIG. 9) from the filtering determination target data and stores the filtering determination target data in the transmission data buffer 402 (Step S724). When the data is stored in the transmission data buffer 402 at Step S724, the data selecting means 40721 notifies the analysis window generating means 403 of a pointer to a memory area with the data stored therein. The data selecting means 40711 may perform this notification via the stream data generating means 401.

The operations subsequent to Step S205 (refer to FIG. 21) after the filtering processing are similar to those of the second embodiment. According to the present modification, even if the data is duplicated, it is possible to prevent the duplicated redundant data from being transmitted to the time series data analyzing means 5.

The filtering means 407 may take such a configuration as to combine plural conditions among the aforementioned first to third conditions, to store only data satisfying the plural conditions in the transmission data buffer 402 and to cancel other data. For example, the filtering means 407 may take such a configuration as to store only data that satisfies the first and second conditions in the transmission data buffer 402, and to cancel other data. How to combine the conditions is not limited in particular.

The respective modifications shown in FIGS. 23 and 27 are also capable of obtaining effects similar to those of the second embodiment.

Figure 30:
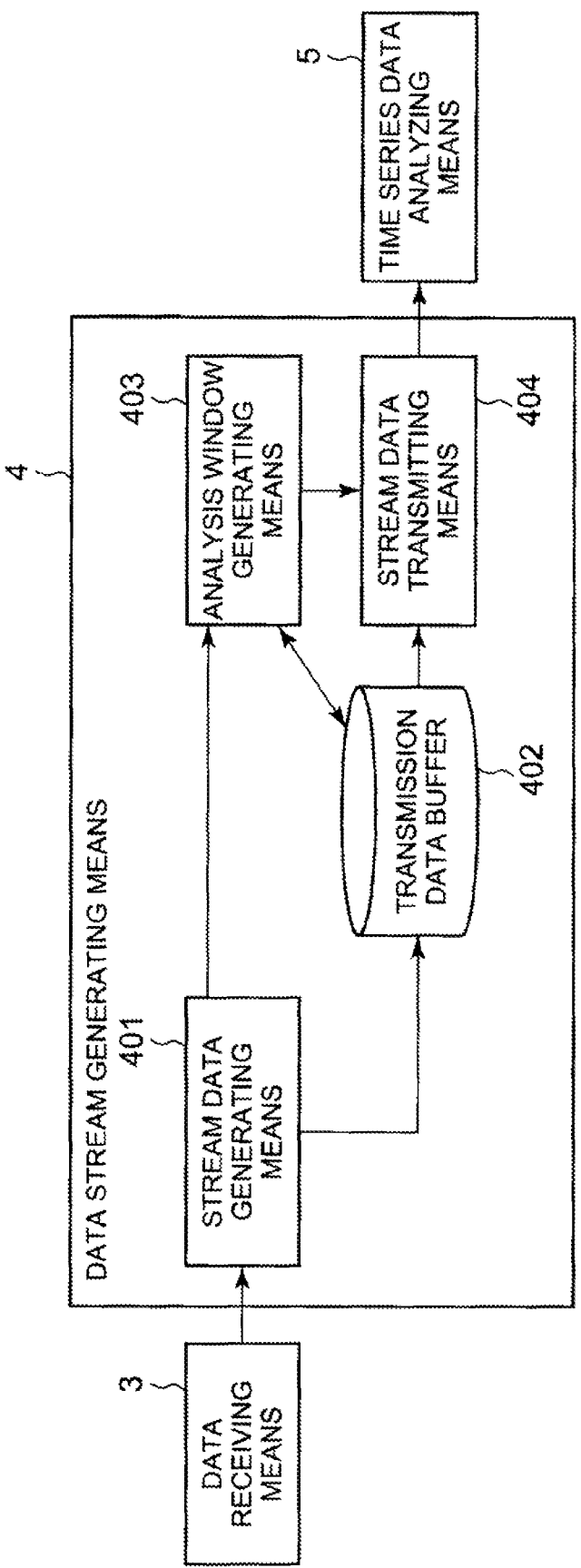
FIG. 30 It depicts a block diagram showing a configuration example of data stream generating means in a reference embodiment.

There is also considered an embodiment applied to the case where the rearrangement of data in time series order is not required for analysis. This embodiment will be explained below. An analysis preprocessing system of the present embodiment is equipped with data receiving means 3 and data stream generating means 4 in a manner similar to the first embodiment shown in FIG. 1. FIG. 30 is a block diagram showing a configuration example of the data stream generating means 4 in the embodiment in which no rearrangement of data is done. In this embodiment, the data stream generating means 4 is equipped with stream data generating means 401, transmission data buffer 402, analysis window generating means 403 and stream data transmitting means 404. These respective means are similar to those of the first embodiment. There is however not provided delay control means 405. The stream data generating means 401 stores all of clipped data in the transmission data buffer 402. When the data is stored in the transmission data buffer 402, the stream data generating means 401 notifies the analysis window generating means 403 of, for example, a pointer to each memory area with the data stored therein, as a notification about its storage. Incidentally, in the embodiment shown in FIG. 30, there is no need to specify a delay maximum data generation source. Therefore, the stream data generating means 401 may not add information about the reception time to each clipped data.

In the configuration shown in FIG. 30, Step S203 (rearrangement control) is not performed at the data stream generation step (Step S2, refer to FIG. 12), but other respects are similar to those of the first embodiment.

Even as the configuration shown in FIG. 30, data can be rapidly transmitted to the time series data analyzing means 5 in comparison with the case where the data is stored as a database or file.

Figure 31:
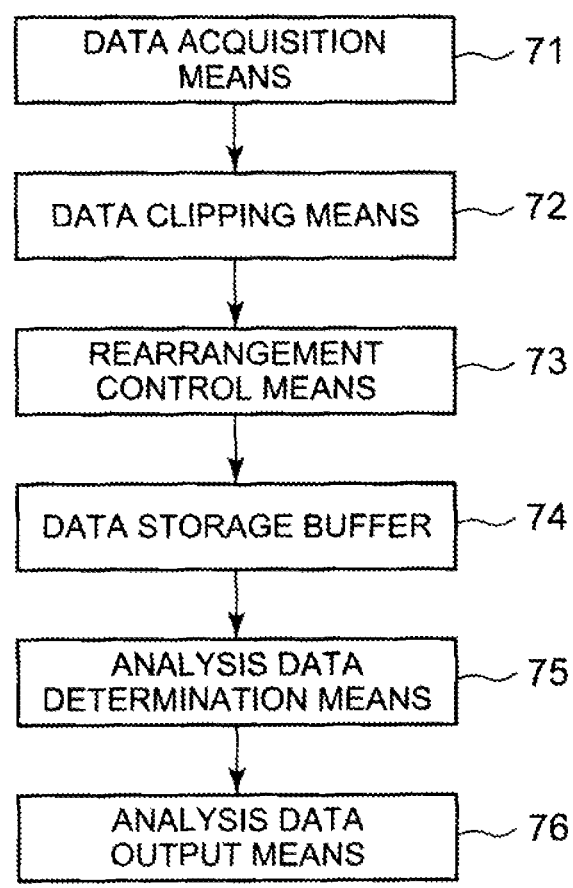
FIG. 31 It depicts an explanatory diagram illustrating a minimum configuration of the present invention.
Figure 32:
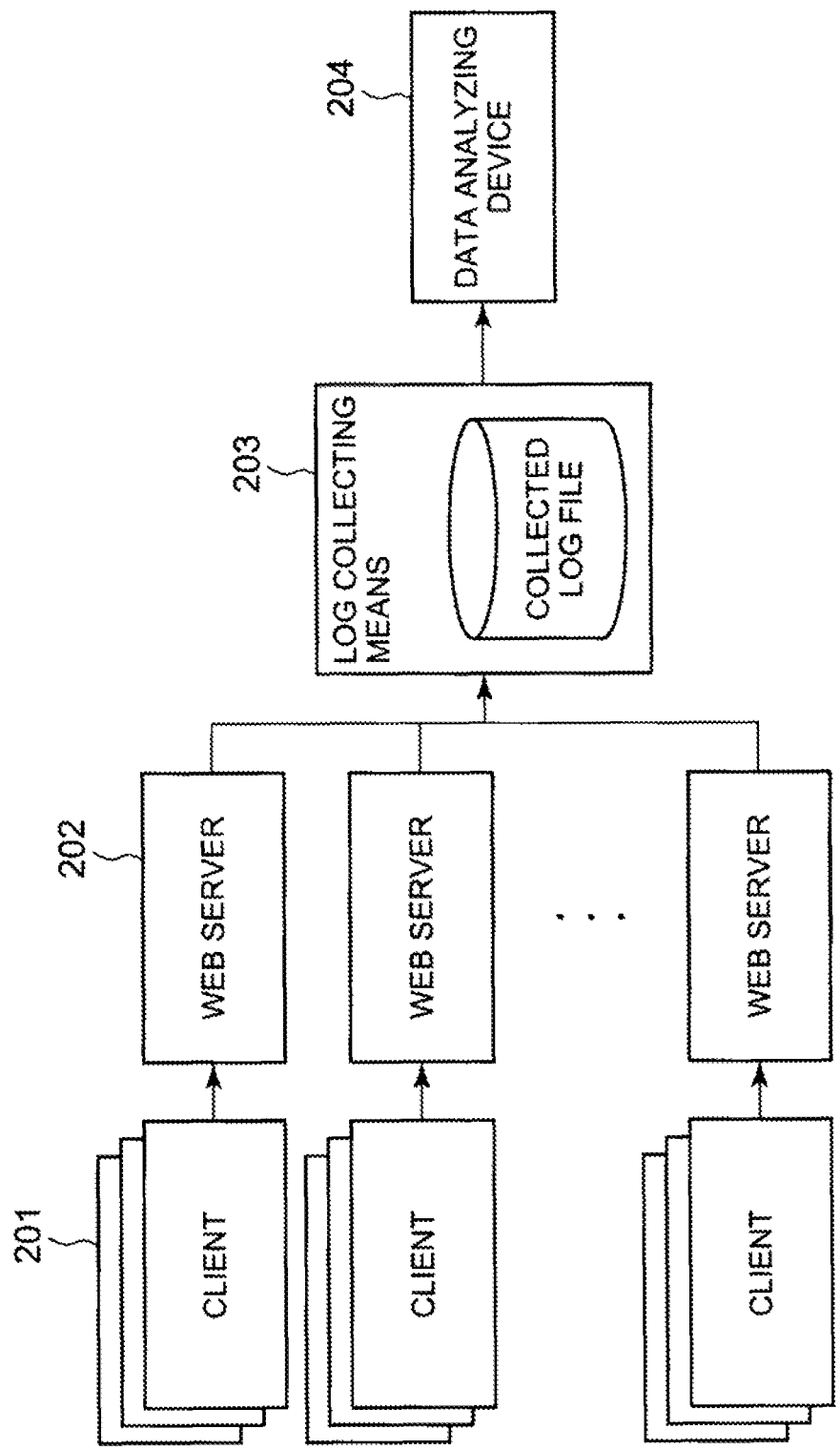
FIG. 32 It depicts a block diagram showing a general configuration example of a system for collecting data to be analyzed.

A minimum configuration of the present invention will next be described. FIG. 31 is an explanatory diagram showing the minimum configuration of the present invention. An analysis preprocessing system of the present invention is equipped with data acquisition means 71, data clipping means 72, rearrangement control means 73, data storage buffer 74, analysis data determination means 75 and analysis data output means 76.

The data acquisition means 71 (e.g., the data receiving means 3) acquires a data group generated by a plurality of data generation sources.

The data clipping means 72 (e.g., the stream data generating means 401) clips each data from the data group acquired by the data acquisition means 71.

The rearrangement control means 73 (e.g., the delay control means 405) retains each data clipped by the data clipping means 72, selects, when data from a delay maximum data generation source is detected, data generated prior to the data and rearranges the selected data in order of time of generation thereof, the delay maximum data generation source corresponding to a data generation source at which a time from the generation of data to the acquisition of the data by the data acquisition means 71 becomes maximum.

The data storage buffer 74 (e.g., the transmission data buffer 402) stores the data rearranged in order of time of generation thereof.

The analysis data determination means (e.g., the analysis window generating means 403) determines an analysis data group (e.g., the analysis windows) which is a set of data used for analysis, from the data stored in the data storage buffer 74.

The analysis data output means 76 (e.g., the stream data transmitting means 404) transmits an analysis data group to its corresponding data analyzing means (e.g., the time series data analyzing means 5) for analyzing data.

With such a configuration as described above, when large amounts of data are received from a large number of data generation sources, it is possible to pass those data to means for analyzing the data at high speed in order of time of generation thereof.

The above embodiment has disclosed a configuration in which the data acquisition means 71 adds information about the time of acquisition of data to the acquired data group, and the rearrangement control means 73 has a temporary buffer (e.g., the temporary buffer 40501) for temporarily retaining each data clipped by the data clipping means 72, delay calculating means (e.g., the delay calculating means 40502) which calculates a delay corresponding to the difference between the time of data generation contained in each data and the time of acquisition thereof, detecting means (e.g., the transfer timing control means 40504) which specifies a data generation source maximum in the delay as a delay maximum data generation source and which, when data generated by the delay maximum data generation source is added to the temporary buffer, detects the addition of the corresponding data, and rearranging means (e.g., the data transfer means 40505) which, when the addition of the data generated by the delay maximum data generation source to the temporary buffer is detected, selects data generated prior to that corresponding data from the temporary buffer and rearranges the selected data in order of time of generation thereof. According to such a configuration, it is possible to specify the delay maximum data generation source.

As well, the above embodiment has disclosed a configuration in which the delay calculating means regularly calculates the delay of each data generation source. According to such a configuration, even if the delay of each data generation source changes with the elapse of time so that the delay maximum data generation source is replaced with another, the delay maximum data generation source can be specified.

Further, the above embodiment has disclosed a configuration in which there is provided filtering means (e.g., the filtering means 407) that determines, for each data rearranged in order of time of generation thereof, whether each data satisfies a predetermined condition, stores the data that satisfies the predetermined condition in the data storage buffer 74 and cancels the data that does not satisfy the predetermined condition. According to such a configuration, redundant data can be prevented from being transmitted to the data analyzing means.

Furthermore, the above embodiment has disclosed a configuration in which the filtering means includes contents coincidence/non-coincidence determining means (e.g., the identity determining means 40702) which determines, for each data rearranged in order of time of generation thereof, whether each data satisfies a condition in which contents of any data already stored in the data storage buffer 74 differ from each other, and data selecting means which cancels the data that does not satisfy the condition and stores the data that satisfies the condition in the data storage buffer 74.

Still further, the above embodiment has disclosed a configuration in which the filtering means includes reference storing means (e.g., the effective data defining means 40713) which stores a reference indicating that the contents contained in data are effective, reference determining means (e.g., the effectivity determining means 40712) which determines, for each data rearranged in order of time of generation thereof, whether the contents of each data satisfy the reference, and data selecting means (e.g., the data selecting means 40711) which cancels each data whose contents do not satisfy the reference and stores each data whose contents satisfy the reference in the data storage buffer 74.

Still further, the above embodiment has disclosed a configuration in which the filtering means includes data identification information storing means (e.g., the processed data storing means 40723) which stores data identification information about each data rearranged in order of time of generation thereof, duplication determining means (e.g., the effectivity determining means 40722) which determines, when the rearrangement control means 73 selects data and rearranges the same, whether data identification information about the corresponding data is being stored in the data identification information storing means and, when the data identification information is not stored therein, stores the data identification information about the corresponding data in the data identification information storing means, and data selecting means (e.g., the data selecting means 40721) which cancels the data whose data identification information is determined to have been stored in the data identification information storing means, and stores the data whose data identification information is determined not to have been stored in the data identification information storing means in the data storage buffer 74.

Still further, the above embodiment has disclosed a configuration in which the analysis data determination means 75 determines a set of data stored in the data storage buffer 74 within a predetermined period as an analysis data group every predetermined period.

Still further, the above embodiment has disclosed a configuration in which the analysis data determination means 75 determines a set of a predetermined number of data as an analysis data group each time the number of data stored in the data storage buffer 74 reaches the predetermined number.

Still further, the above embodiment has disclosed a configuration in which the analysis data output means 76 deletes each data that belongs to the analysis data group transmitted to the data analyzing means, from the data storage buffer 74.

Still further, the above embodiment has disclosed a configuration that includes data analyzing means for analyzing data, the data analyzing means performing an analysis asynchronously with the analysis data output means 76 by retaining the analysis data group output by the analysis data output means 76 and deleting an analysis data group after the completion of analysis.

Incidentally, the characteristic configurations of such an analysis preprocessing system as shown in each of the following (1) through (12) are shown in the above embodiments.

(1) An analysis preprocessing system includes: a data acquisition unit which acquires a data group generated by a plurality of data generation sources; a data clipping unit which clips each data from the data group acquired by the data acquisition unit; a rearrangement control unit which retains each data clipped by the data clipping unit, selects data generated prior to the corresponding data when data from a delay maximum data generation source is detected, and rearranges the selected data in order of time of generation thereof, the delay maximum data generation source corresponding to a data generation source at which the time from the generation of data to the acquisition of the data by the data acquisition unit becomes maximum; a data storage buffer which stores the data rearranged in order of time of generation thereof; an analysis data determination unit which determines an analysis data group which is a set of data used for analysis, from the data stored in the data storage buffer; and an analysis data output unit which transmits the analysis data group to a data analyzing unit for analyzing data.

(2) In the analysis preprocessing system, the data acquisition unit adds information about the time of acquisition of data to the acquired data group, and the rearrangement control unit includes: a temporary buffer for temporarily retaining each data clipped by the data clipping unit; a delay calculation unit which calculates a delay corresponding to a difference between the time of data generation contained in each data and the time of acquisition thereof; a detection unit which specifies a data generation source maximum in the delay as a delay maximum data generation source and which, when data generated by the delay maximum data generation source is added to the temporary buffer, detects the addition of the corresponding data; and a rearrangement unit which, when the addition of the data generated by the delay maximum data generation source to the temporary buffer is detected, selects data generated prior to the corresponding data from the temporary buffer and rearranges the selected data in order of time of generation thereof.

(3) In the analysis preprocessing system, the delay calculation unit regularly calculates the delay of each data generation source.

(4) The analysis preprocessing system includes a filtering unit which determines, for each data rearranged in order of time of generation thereof, whether each data satisfies a predetermined condition, stores the data that satisfies the predetermined condition in the data storage buffer, and cancels the data that does not satisfy the predetermined condition.

(5) In the analysis preprocessing system, the filtering unit includes: a contents coincidence/non-coincidence determining unit which determines, for each data rearranged in order of time of generation thereof, whether each data satisfies a condition in which contents of any data already stored in the data storage buffer differ from each other; and a data selecting unit which cancels the data that does not satisfy the condition and stores the data that satisfies the condition in the data storage buffer.

(6) In the analysis preprocessing system, the filtering unit includes: a reference storing unit which stores a reference indicating that the contents contained in data are effective; a reference determining unit which determines, for each data rearranged in order of time of generation thereof, whether the contents of each data satisfy the reference; and a data selecting unit which cancels each data whose contents do not satisfy the reference and stores each data whose contents satisfy the reference in the data storage buffer.

(7) In the analysis preprocessing system, the filtering unit includes: a data identification information storing unit which stores data identification information about each data rearranged in order of time of generation thereof; a duplication determining unit which determines, when the rearrangement control unit selects data and rearranges the same, whether data identification information about the corresponding data is being stored in the data identification information storing unit and, when the data identification information is not stored therein, stores the data identification information about the corresponding data in the data identification information storing unit; and a data selecting unit which cancels the data whose data identification information is determined to have been stored in the data identification information storing unit, and stores the data whose data identification information is determined not to have been stored in the data identification information storing unit in the data storage buffer.

(8) In the analysis preprocessing system, the analysis data determination unit determines a set of data stored in the data storage buffer within a predetermined period as an analysis data group every predetermined period.

(9) In the analysis preprocessing system, the analysis data determination unit determines a set of a predetermined number of data as an analysis data group each time the number of data stored in the data storage buffer reaches the predetermined number.

(10) In the analysis preprocessing system, the analysis data output unit deletes each data that belongs to the analysis data group transmitted to the data analyzing unit, from the data storage buffer.

(11) The analysis preprocessing system includes a data analyzing unit for analyzing data, the data analyzing unit performing an analysis asynchronously with the analysis data output unit by retaining the analysis data group output by the analysis data output unit and deleting an analysis data group after the completion of analysis.

(12) An analysis preprocessing system includes: data acquisition means which acquires a data group generated by a plurality of data generation sources; data clipping means which clips each data from the data group acquired by the data acquisition means; rearrangement control means which retains each data clipped by the data clipping means, selects data generated prior to the corresponding data when data from a delay maximum data generation source is detected, and rearranges the selected data in order of time of generation thereof, the delay maximum data generation source corresponding to a data generation source at which a time from the generation of data to the acquisition of the data by the data acquisition means becomes maximum; a data storage buffer which stores the data rearranged in order of time of generation thereof; analysis data determination means which determines an analysis data group which is a set of data used for analysis, from the data stored in the data storage buffer; and analysis data output means which transmits the analysis data group to data analyzing means for analyzing data.

Although the invention of the present application has been described above with reference to the embodiments, the invention of the present application is not limited to the above embodiments. Various changes that can be recognized by those skilled in the art can be made to the configuration and details of the invention of the present application within the scope thereof.

This application claims priority based on Japanese Patent Application No. 2009-038412 filed on Feb. 20, 2009, the disclosure of which is incorporated herein in its entirety.

INDUSTRIAL APPLICABILITY

The present invention is applied suitably to an analysis preprocessing system which compiles data for analysis collected for the purpose of their analyses.

REFERENCE SIGNS LIST

1 Time series data generation source
2 Data transmitting means
3 Data receiving means
4 Data stream generating means
5 Time series data analyzing means
7 Analysis preprocessing system
401 Stream data generating means
402 Transmission data buffer
403 Analysis window generating means
404 Stream data transmitting means
405 Delay control means
40501 Temporary buffer
40502 Delay calculating means
40503 Delay storing means
40504 Transfer timing control means
40505 Data transfer means
407 Filtering means
40701 Data selecting means
40702 Identity determining means
40711, 40721 Data selecting means
40712, 40722 Effectivity determining means
40713 Effective data defining means
40723 Processed data storing means

The invention claimed is:

1. An analysis preprocessing system comprising:
a data acquisition unit which acquires a data group generated by a plurality of data generation sources;
a data clipping unit which clips each data from the data group acquired by the data acquisition unit;
a rearrangement control unit which retains each data clipped by the data clipping unit, selects data generated prior to the corresponding data when data from a delay maximum data generation source is detected, and rearranges the selected data in order of time of generation thereof, the delay maximum data generation source corresponding to a data generation source at which a time from the generation of data to the acquisition of the data by the data acquisition unit becomes maximum;
a data storage buffer which stores the data rearranged in order of time of generation thereof;
an analysis data determination unit which determines an analysis data group which is a set of data used for analysis, from the data stored in the data storage buffer; and
an analysis data output unit which transmits the analysis data group to a data analyzing unit for analyzing data.

2. The analysis preprocessing system according to claim 1, wherein the data acquisition unit adds information about the time of acquisition of data to the acquired data group, and
the rearrangement control unit includes:
a temporary buffer for temporarily retaining each data clipped by the data clipping unit;
a delay calculating unit which calculates a delay corresponding to a difference between the time of data generation contained in each data and the time of acquisition thereof;
a detecting unit which specifies a data generation source maximum in the delay as a delay maximum data generation source and which, when data generated by the delay maximum data generation source is added to the temporary buffer, detects the addition of the corresponding data; and
a rearranging unit which, when the addition of the data generated by the delay maximum data generation source to the temporary buffer is detected, selects data generated prior to the corresponding data from the temporary buffer and rearranges the selected data in order of time of generation thereof.

3. The analysis preprocessing system according to claim 2, wherein the delay calculating unit regularly calculates the delay of each data generation source.

4. The analysis preprocessing system according to claim 1, further comprising:
a filtering unit which determines, for each data rearranged in order of time of generation thereof, whether each data satisfies a predetermined condition,
stores the data that satisfies the predetermined condition in the data storage buffer, and cancels the data that does not satisfy the predetermined condition.

5. The analysis preprocessing system according to claim 4, wherein the filtering unit includes:
a contents coincidence/non-coincidence determining unit which determines, for each data rearranged in order of time of generation thereof, whether each data satisfies a condition in which contents of any data already stored in the data storage buffer differ from each other; and
a data selecting unit which cancels the data that does not satisfy the condition and stores the data that satisfies the condition in the data storage buffer.

6. The analysis preprocessing system according to claim 4, wherein the filtering unit includes:
a reference storing unit which stores a reference indicating that the contents contained in data are effective;
a reference determining unit which determines, for each data rearranged in order of time of generation thereof, whether the contents of each data satisfy the reference; and
a data selecting unit which cancels each data whose contents do not satisfy the reference and stores each data whose contents satisfy the reference in the data storage buffer.

7. The analysis preprocessing system according to claim 4, wherein the filtering unit includes:
a data identification information storing unit which stores data identification information about each data rearranged in order of time of generation thereof;

a duplication determining unit which determines, when the rearrangement control unit selects data and rearranges the same, whether data identification information about the corresponding data is being stored in the data identification information storing unit and, when the data identification information is not stored therein, stores the data identification information about the corresponding data in the data identification information storing unit; and a data selecting unit which cancels the data whose data identification information is determined to have been stored in the data identification information storing unit, and stores the data whose data identification information is determined not to have been stored in the data identification information storing unit in the data storage buffer.

8. The analysis preprocessing system according to claim 1, wherein the analysis data determination unit determines a set of data stored in the data storage buffer within a predetermined period as an analysis data group every predetermined period.

9. The analysis preprocessing system according to claim 1, wherein the analysis data determination unit determines a set of a predetermined number of data as an analysis data group each time the number of data stored in the data storage buffer reaches the predetermined number.

10. The analysis preprocessing system according to claim 1,
wherein the analysis data output unit deletes each data that belongs to the analysis data group transmitted to the data analyzing unit, from the data storage buffer.

11. The analysis preprocessing system according to claim 1, further comprising a data analyzing unit for analyzing data,
wherein the data analyzing unit holds the analysis data group output by the analysis data output unit and deletes an analysis data group after the completion of analysis to thereby perform an analysis asynchronously with the analysis data output unit.

12. An analysis preprocessing method comprising the steps of:
acquiring a data group generated by a plurality of data generation sources;
clipping each data from the acquired data group;
retaining each clipped data, selecting data generated prior to the corresponding data when data from a delay maximum data generation source is detected, and rearranging the selected data in order of time of generation thereof, the delay maximum data generation source corresponding to a data generation source at
which a time from the generation of data to the acquisition of the data becomes maximum;
storing the data rearranged in order of time of generation thereof in a data storage buffer;
determining an analysis data group which is a set of data used for
analysis, from the data stored in the data storage buffer; and
transmitting the analysis data group to a data analyzing unit for analyzing data.

13. The analysis preprocessing method according to claim 12, further comprising the steps of:
adding information about the time of acquisition of data to the acquired
data group;
calculating a delay corresponding to a difference between the time of data generation contained in each data and the time of acquisition thereof;
specifying a data generation source maximum in the delay as a delay maximum data generation source and, when data generated by the delay maximum data generation source is added to a temporary buffer for temporarily retaining each clipped data, detecting the addition of the corresponding data; and
when the addition of the data generated by the delay maximum data generation source to the temporary buffer is detected, selecting data generated prior to the corresponding data from the temporary buffer and rearranging the selected data in order of time of generation thereof.

14. A computer readable information recording medium storing an analysis preprocessing program which, when executed by a processor, performs a method for analysis preprocessing, the method comprising:
data acquisition processing for acquiring a data group generated by a plurality of data generation sources;
data clipping processing for clipping each data from the data group acquired by the data acquisition processing;
rearrangement control processing for retaining each data clipped by the data clipping processing, selecting data generated prior to the corresponding data when data from a delay maximum data generation source is detected, and
rearranging the selected data in order of time of generation thereof, the delay maximum data generation source corresponding to a data generation source at which a time from the generation of data to the acquisition of the data by the data acquisition processing becomes maximum;
data storage processing for storing the data rearranged in order of time of generation thereof in a data storage buffer;
analysis data determination processing for determining an analysis data group which is a set of data used for analysis, from the data stored in the data storage buffer; and
analysis data output processing for transmitting the analysis data group to a data analyzing unit for analyzing data.

15. The computer readable information recording medium according to claim 14, further comprising:
adding information about the time of acquisition of data to the acquired data group; and
which causes the computer to execute in the rearrangement control processing:
delay calculating processing for calculating a delay corresponding to a difference between the time of data generation contained in each data and the time of acquisition thereof;
detection processing for specifying a data generation source maximum in the delay as a delay maximum data generation source and, when data generated by the delay maximum data generation source is added to a temporary buffer for temporarily retaining each clipped data, detecting the addition of the corresponding data; and
rearrangement processing for, when the addition of the data generated by the delay maximum data generation source to the temporary buffer is detected, selecting data generated prior to the corresponding data from the
temporary buffer and rearranging the selected data in order of time of generation thereof.

16. An analysis preprocessing system comprising:
data acquisition means which acquires a data group generated by a plurality of data generation sources;
data clipping means which clips each data from the data group acquired by the data acquisition means;
rearrangement control means which retains each data clipped by the data clipping means, selects data generated prior to the corresponding data when data from a delay maximum data generation source is detected, and rearranges the selected data in order of time of generation thereof, the delay maximum data generation source corresponding to a data generation source at which a time from the generation of data to the acquisition of the data by the data acquisition means becomes maximum;

a data storage buffer which stores the data rearranged in order of time of generation thereof;

analysis data determination means which determines an analysis data group which is a set of data used for analysis, from the data stored in the data storage buffer; and analysis data output means which transmits the analysis data group to data analyzing means for analyzing data.

* * * * *